(12) United States Patent
Cha et al.

(10) Patent No.: US 12,087,265 B2
(45) Date of Patent: Sep. 10, 2024

(54) METHOD AND APPARATUS FOR ACTIVE NOISE CANCELLATION USING DEEP LEARNING

(71) Applicant: University of Manitoba, Winnipeg (CA)

(72) Inventors: Young Jin Cha, Winnipeg (CA); Sukhpreet Singh Benipal, Winnipeg (CA)

(73) Assignee: University of Manitoba, Winnipeg (CA)

(*) Notice: Subject to any disclaimer, the term of this patent is extended or adjusted under 35 U.S.C. 154(b) by 48 days.

(21) Appl. No.: 18/177,885

(22) Filed: Mar. 3, 2023

(65) Prior Publication Data

US 2023/0282193 A1    Sep. 7, 2023

Related U.S. Application Data

(60) Provisional application No. 63/316,222, filed on Mar. 3, 2022.

(51) Int. Cl.
G10K 11/178 (2006.01)

(52) U.S. Cl.
CPC ...... *G10K 11/1781* (2018.01); *G10K 11/1785* (2018.01)

(58) Field of Classification Search
CPC .................. G10K 11/1781; G10K 11/1785
See application file for complete search history.

(56) References Cited

U.S. PATENT DOCUMENTS

2021/0065731 A1* 3/2021 Matsukawa ........ G10K 11/1785
2022/0262336 A1* 8/2022 Truong ............ G10K 11/17823

FOREIGN PATENT DOCUMENTS

| CN | 112382265 A | * | 2/2021 |
| CN | 112562628 A | * | 3/2021 |
| CN | 115171642 A | * | 10/2022 |

OTHER PUBLICATIONS

Benipal, "Active Noise Cancellation Using Astrous Scaled Convolution Recurrent Neural Network" (Year: 2020).*

* cited by examiner

*Primary Examiner* — David L Ton
(74) *Attorney, Agent, or Firm* — Ryan W. Dupuis; Michael R. Williams; Ade & Company Inc.

(57) ABSTRACT

A computer-implemented method for generating anti-noise using an anti-noise generator to suppress noise from a noise source in an environment comprises processing a sound signal, which is representative of ambient sound including noise, anti-noise and propagation noise from the environment, using a deep learning algorithm configured to generate an anti-noise signal to form anti-noise. The deep learning algorithm comprises a convolution layer; after the convolution layer, a series of atrous scaled convolution modules, wherein each of the atrous scaled convolution modules comprises an atrous convolution, a nonlinear activation function after the atrous convolution, and a pointwise convolution after the nonlinear activation function; after the series of atrous scaled convolution modules, a recurrent neural network; and after the recurrent neural network, a plurality of fully connected layers.

24 Claims, 15 Drawing Sheets

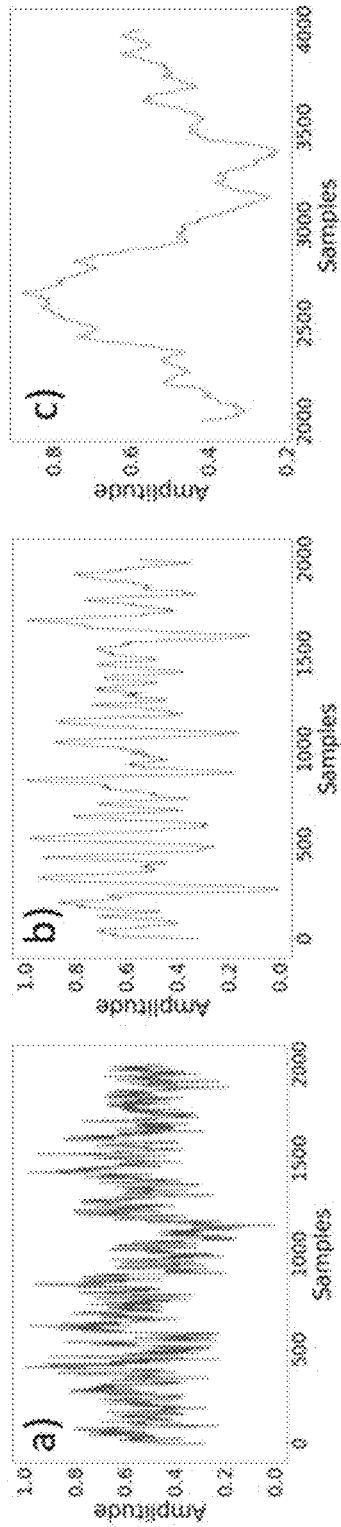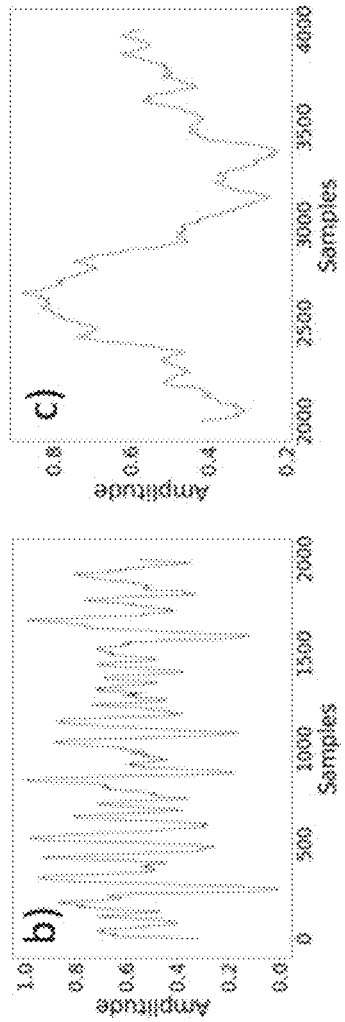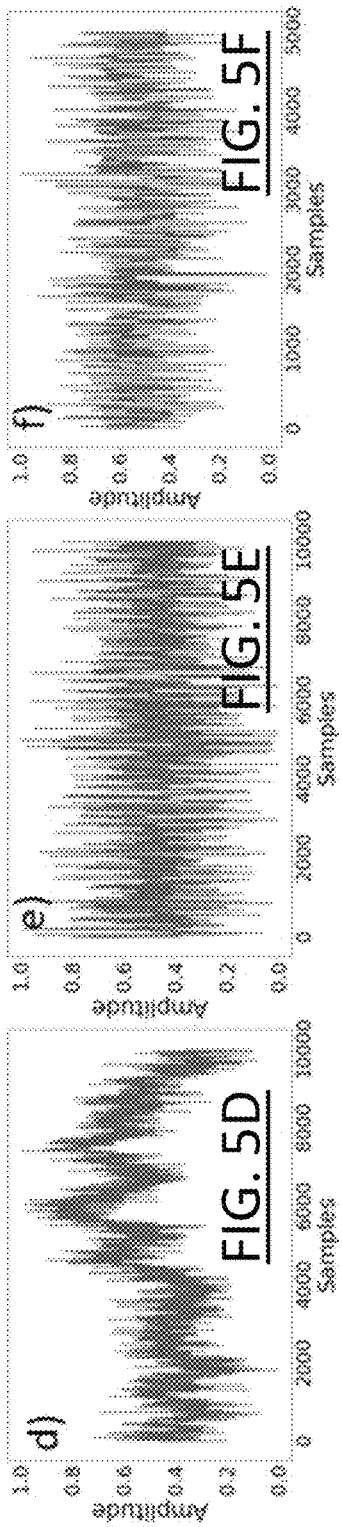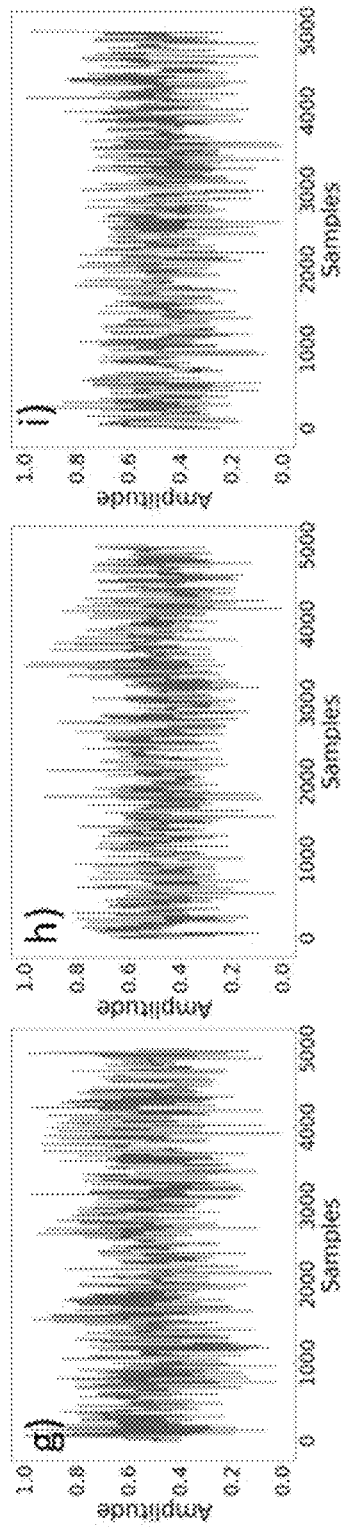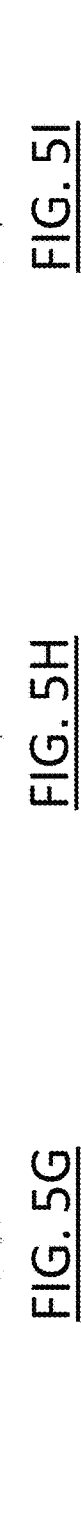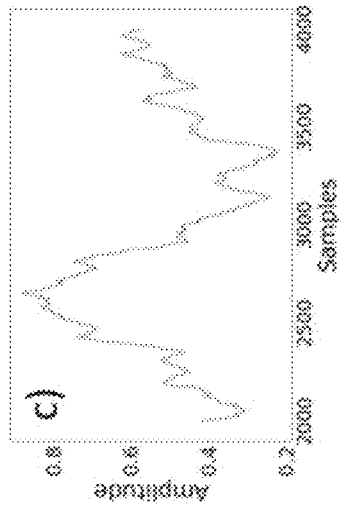
FIG. 5A FIG. 5B FIG. 5C FIG. 5D FIG. 5E FIG. 5F FIG. 5G FIG. 5H FIG. 5I

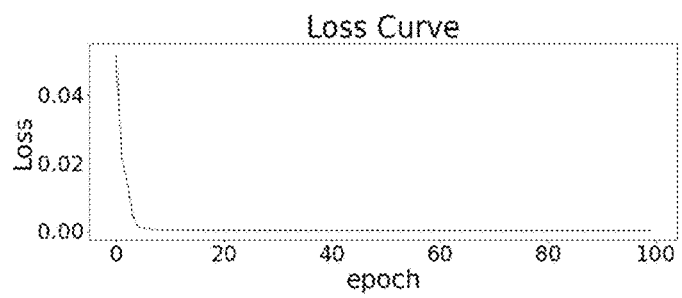
FIG. 10
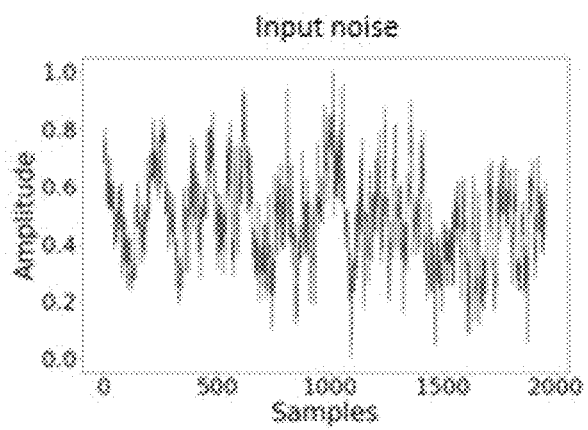
FIG. 11Ai
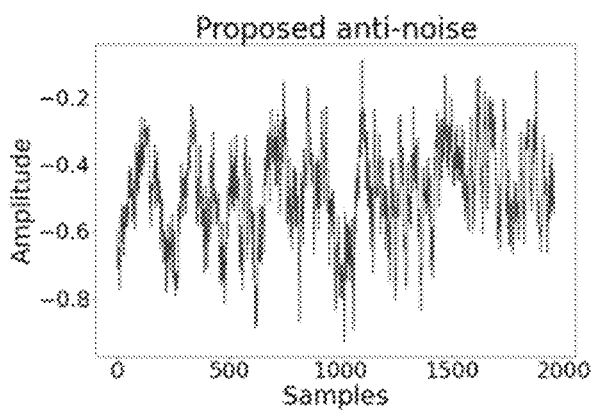
FIG. 11Aii
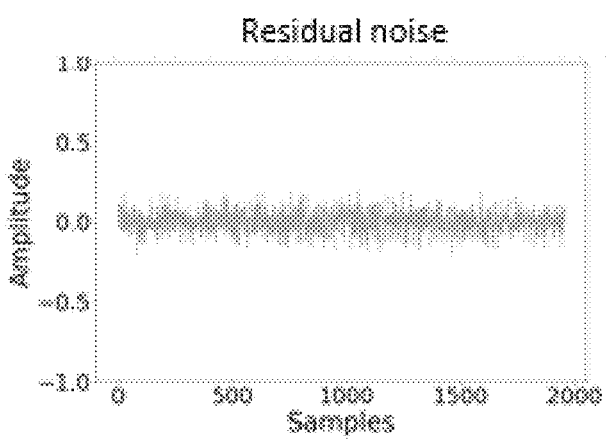
FIG. 11Aiii

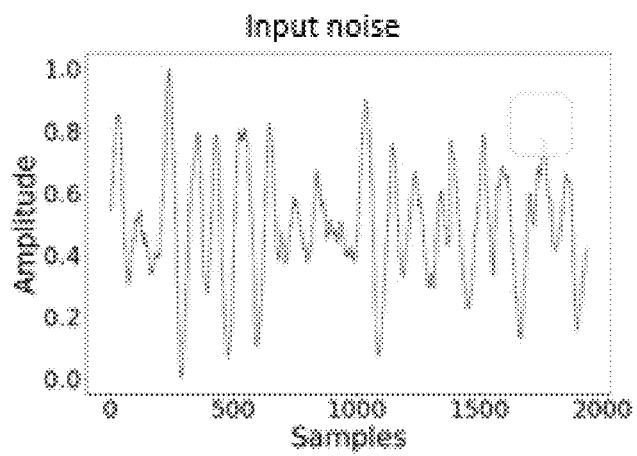
FIG. 11Bi
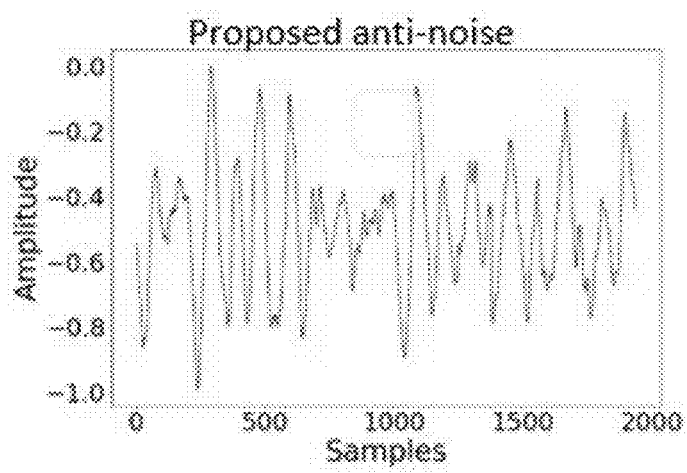
FIG. 11Bii
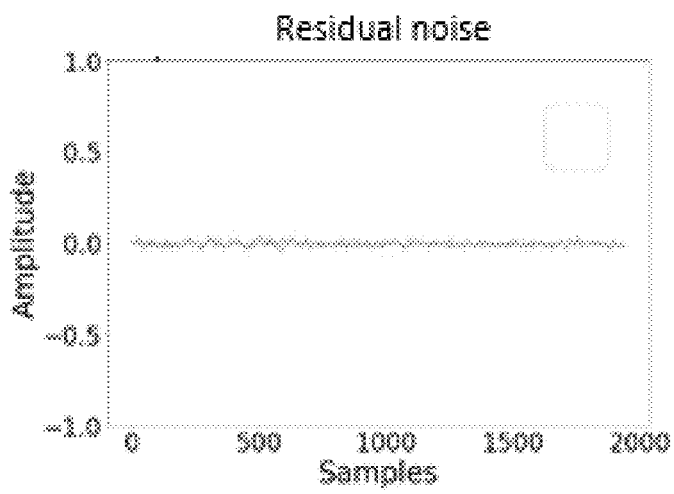
FIG. 11Biii

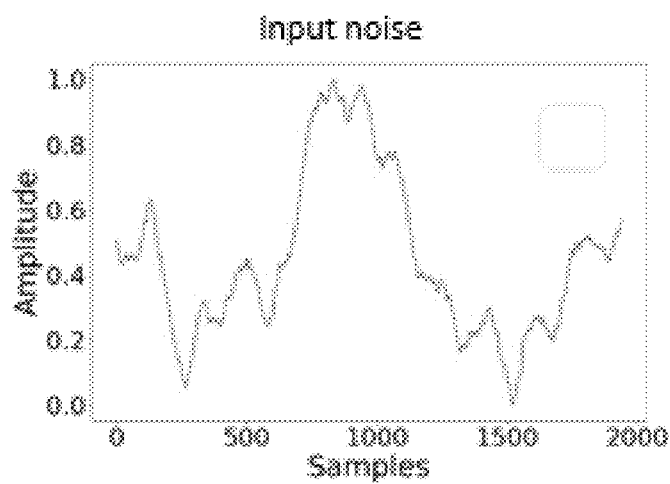
FIG. 11Ci
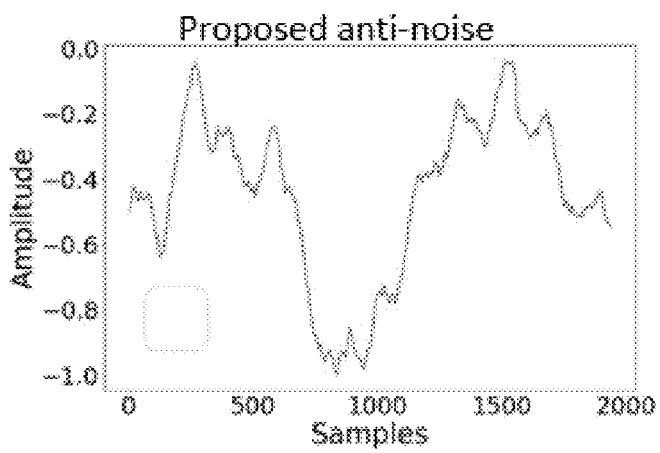
FIG. 11Cii
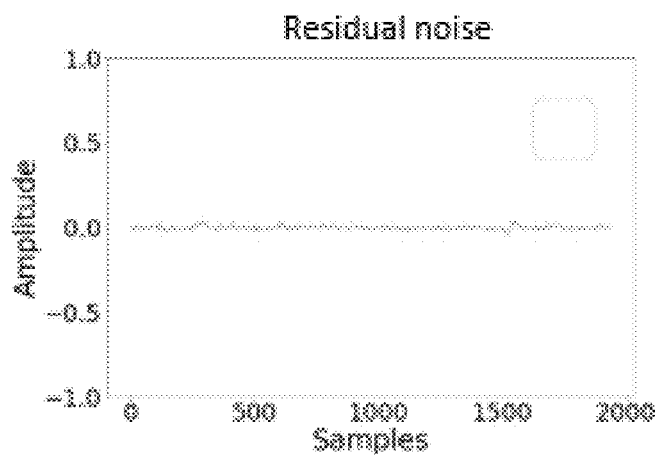
FIG. 11Ciii

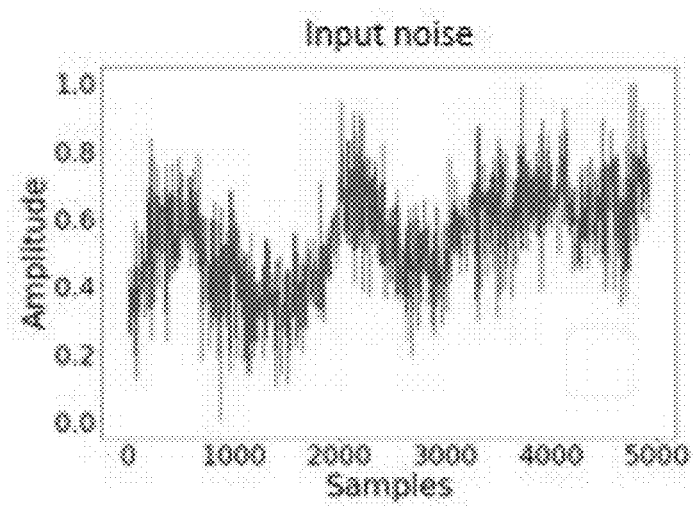
FIG. 11Di
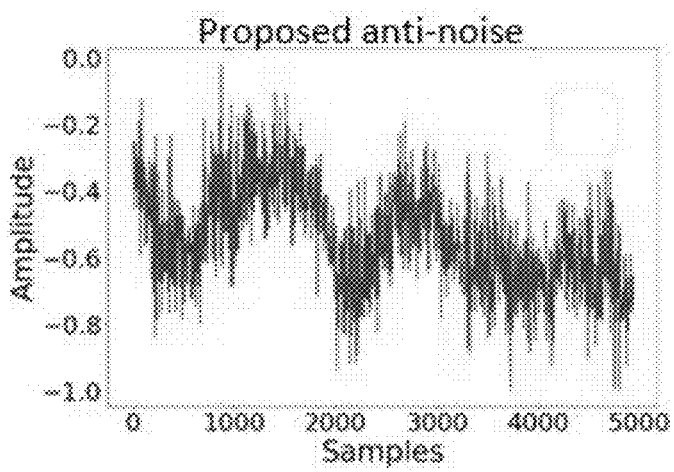
FIG. 11Dii
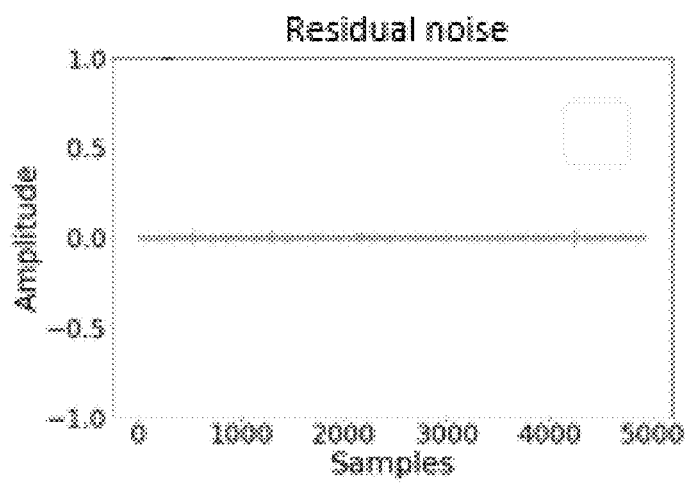
FIG. 11Diii

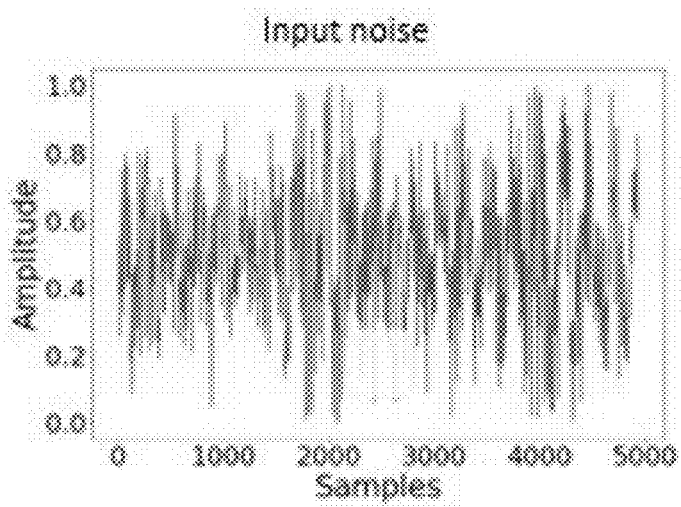
FIG. 11Ei
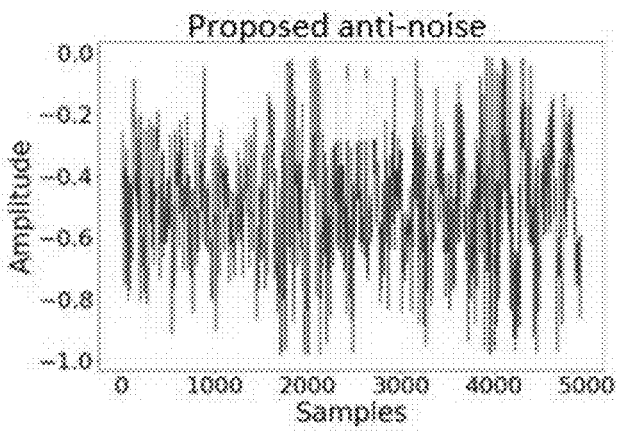
FIG. 11Eii
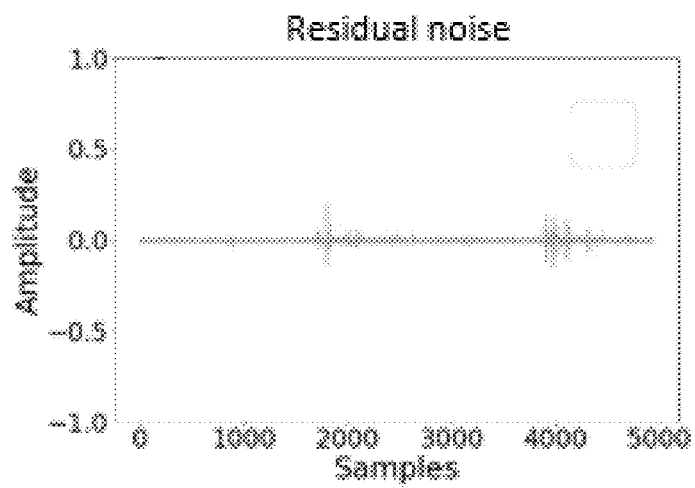
FIG. 11Eiii

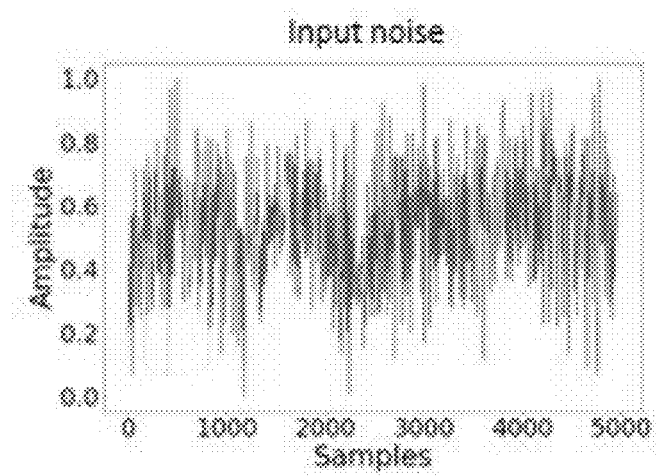
FIG. 11Fi
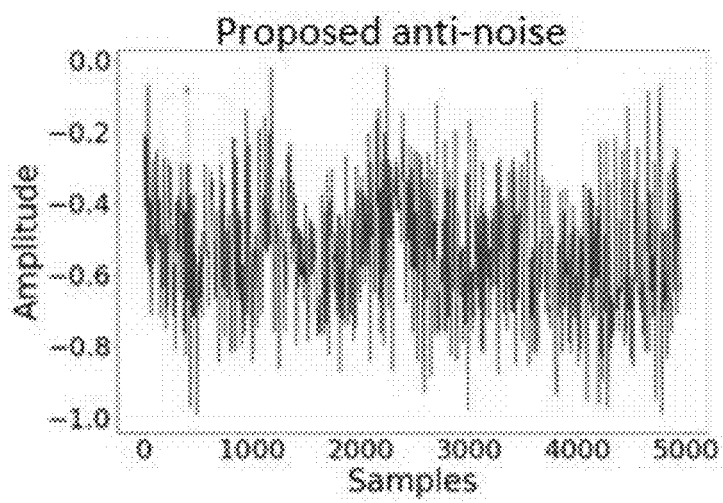
FIG. 11Fii
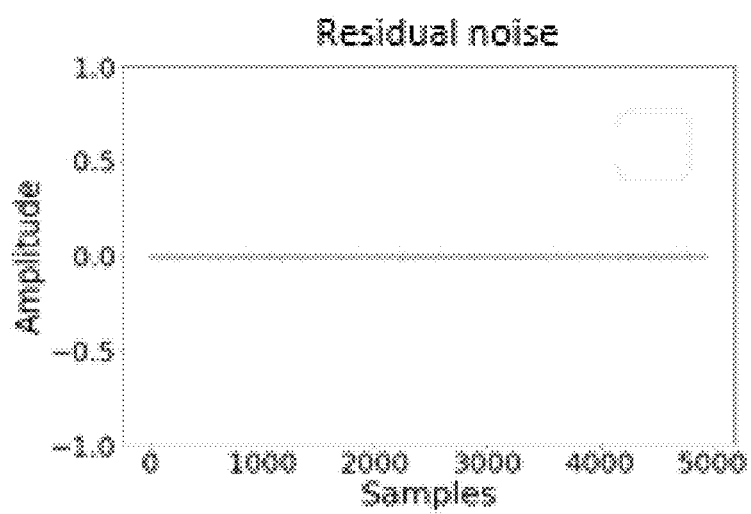
FIG. 11Fiii

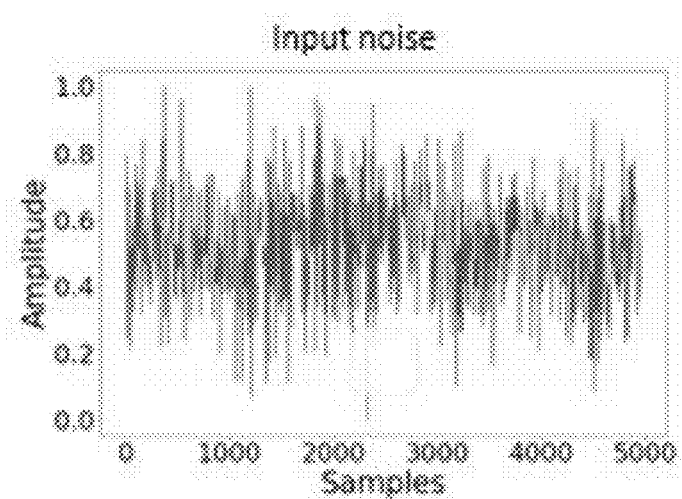
FIG. 11Gi
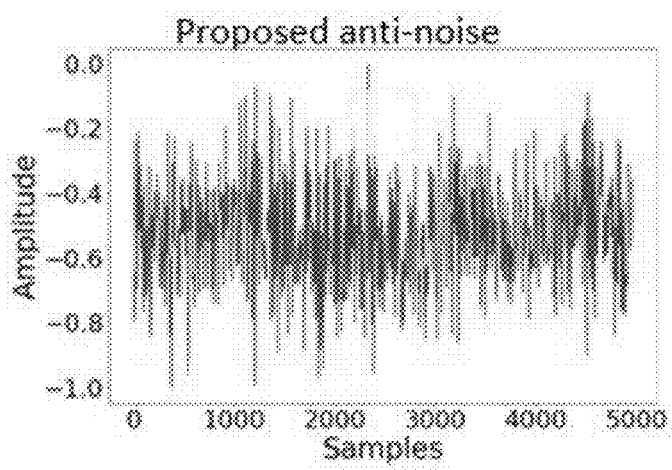
FIG. 11Gii
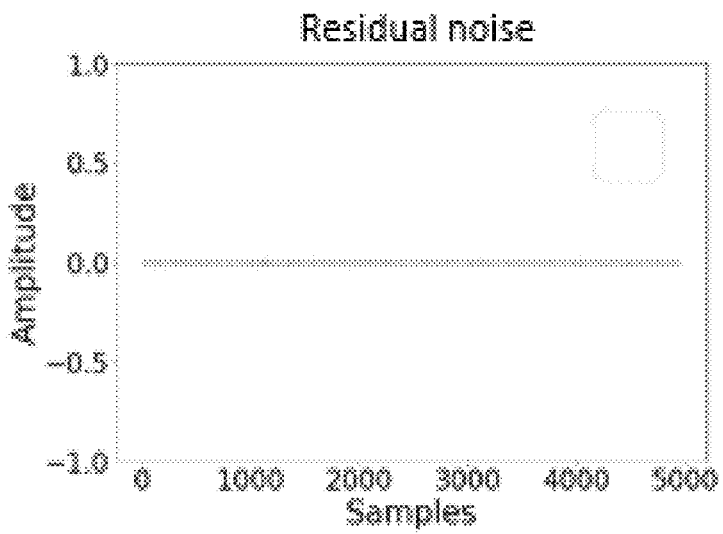
FIG. 11Giii

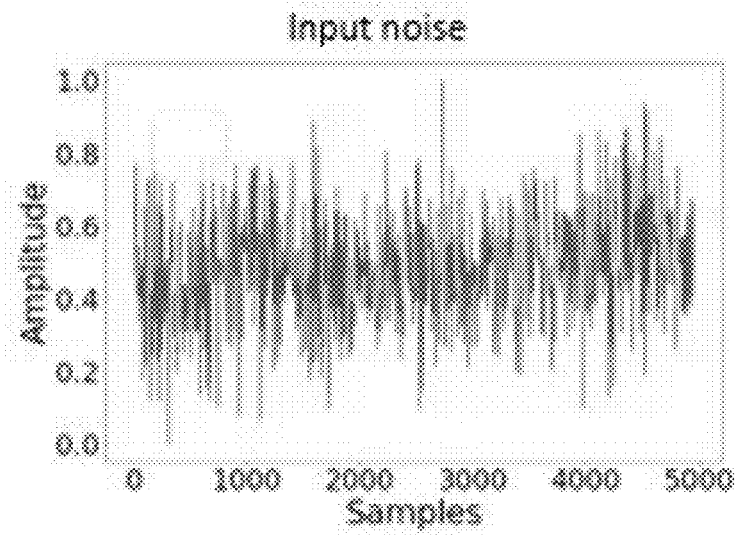
FIG. 11Hi
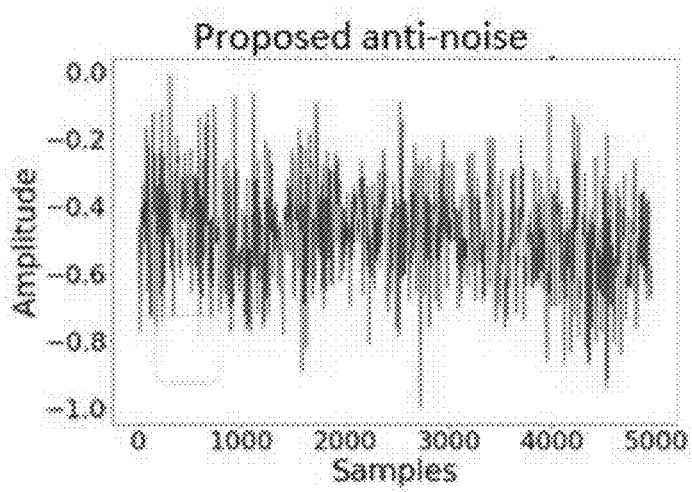
FIG. 11Hii
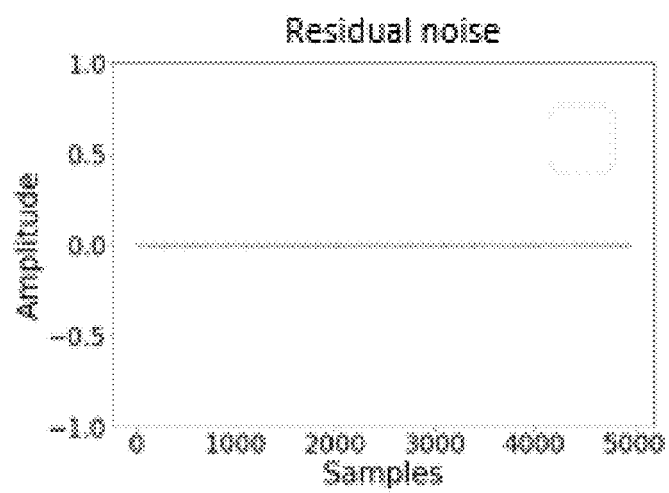
FIG. 11Hiii

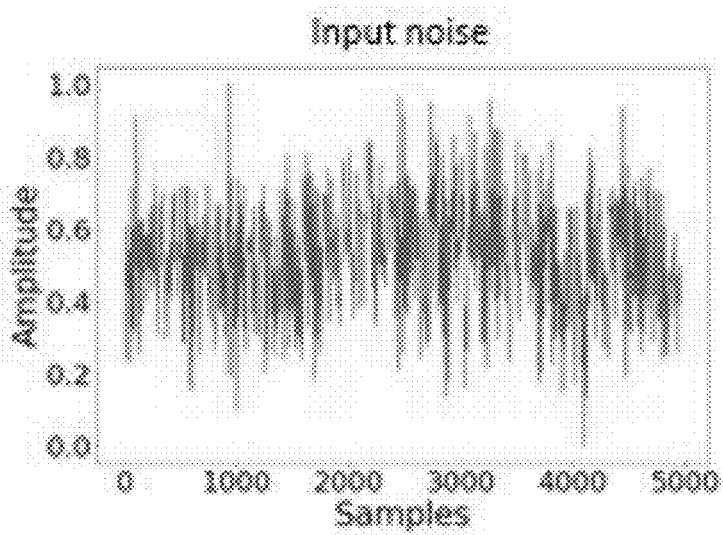
FIG. 11Ii
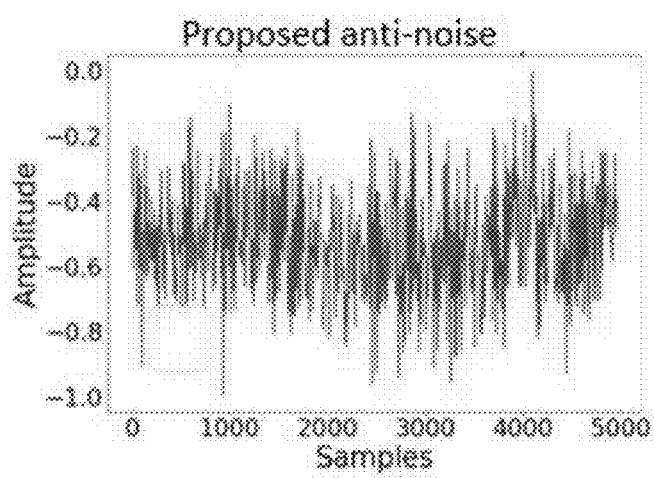
FIG. 11Iii
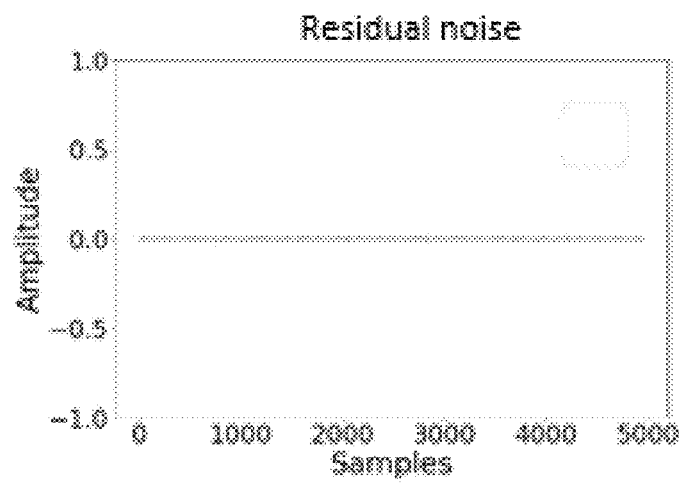
FIG. 11Iiii

METHOD AND APPARATUS FOR ACTIVE NOISE CANCELLATION USING DEEP LEARNING

This application claims the benefit under 35 U.S.C. 119(e) of U.S. Provisional application Ser. No. 63/316,222 filed Mar. 3, 2022, which is incorporated by reference herein.

FIELD OF THE INVENTION

The present invention relates generally to a method and apparatus for active noise cancellation using deep learning, and more particularly to such a method and apparatus in which a deep learning algorithm is adapted to suppress temporal noise.

BACKGROUND

It has been proven that external environmental noise affects human mental health and work performance. Noises cause increased blood pressure and long-term memory loss (Stansfeld & Matheson, 2003). Gupta and Ghatak (2011) noted that higher noise levels can cause insomnia, irregular heart rates, and speech-related problems. The main sources of environmental noise include construction sites and their machineries, airplanes, vehicles, mining, and electric transformers. In the past few decades, researchers have shown the importance of noise cancelation and how it can improve the cognitive behavior of human beings. To avoid the negative effects of excessive noise, researchers have proposed ideas for both passive noise cancelation (PNC) (Lee & Swenson, 1992) and active noise control/cancelation (ANC) (Lueg, 1936).

PNC is the isolation of a space from external noise. This isolation can be achieved by implementing a design that absorbs noise and vibrational energy (Denenberg et al., 1992). Marburg et al. (2002) used structural-acoustic optimization to control environmental noise. Other structural modifications and materials include noise absorbers, dampers, barriers, or similar items, such as soundproofing foam, mass-loaded vinyl, and acoustic fabric. However, as these PNC modifications are expensive and may have structural limitations in their adoption, the focus shifts toward ANC.

A typical ANC system consists of the primary noise source, active noise controller, and an anti-noise signal generator (e.g., a speaker), along with a primary noise measurement sensor (e.g., microphone) to measure unwanted noises, and an error microphone to measure the remaining noises after cancelation. The system produces an anti-noise signal of equal amplitude with the opposite phase by inputting the noises from the primary noise sensor and/or error noise sensor to a digital controller, and then sending it to an anti-noise generator (e.g., speaker). The superposition of the noise and anti-noise generated by a digital controller cancels unwanted noises.

ANC can be broadly classified into feed-forward, feedback, and hybrid ANC systems (Kuo & Morgan, 1999). A feed-forward ANC system has two noise sensors to measure primary noise and error noise. A hybrid system usually shows the best performance, but it is also quite dependent on the noise environment. Feedback ANC systems can be classified into traditional narrow band noise cancelation and broad band noise cancelation with adaptive controllers. Traditional narrow band noise cancelation systems (Bai & Lee, 1997; Kaiser et al., 2003; Chang & Li, 2010) have a precise design of the controller to cancel a specific narrow range of noises, which may lead to controller stability problems. The filtered-x least mean square (xLMS) algorithm (Bjarnason et al., 1995) was developed to consider the secondary path effects that cause frequency and phase distortion of the anti-noise signal from the adaptive filter to the error microphone. To counteract these secondary path effects, an inverse filter is introduced between the reference signal and the LMS algorithm (Kuo & Morgan, 1996; Douglas et al., 1999; Larsson et al., 2011). A leaky filtered-xLMS algorithm addresses the instability caused by finite arithmetic precision due to very small updates (Tobias & Seara, 2002; Cartes & Ray, 2002). The problem is corrected by eliminating a small part of the weight updates by implementing leakage with the gradient descent algorithm. However, these traditional methods only work for linear and tonal noise (Luo et al., 2017).

Another issue is that using a primary noise sensor and an error sensor together induces feedback from the anti-noise signal speaker to the primary noise microphone (Oppenheim et al., 1994). Some approaches have been proposed to resolve this issue by considering the effects of feedback (Eriksson, 1991). Oppenheim et al. (1994) proposed a single sensor-based feedback ANC control system that uses only an error sensor to consider the primary noise and the remaining noises after cancelation.

Some machine learning-based single sensor-based ANC control algorithms have been developed as adaptive controllers to cancel high nonlinear and nonstationary noises. Chen and Chiueh (1996) provided the applicability of multilayered neural networks in the field of ANC. Na and Chae (1997) applied an Elman recurrent neural network (ERNN) (Elman et al., 1990) as the controller for a single-sensor feedback ANC system, which has been shown to outperform traditional methods. ERNN consists of internal weighted looped connections, known as the recurrent layer, which help the network to possess short-term memory. Therefore, these networks are used to extract temporal features and patterns from past data to predict the new system (Toha & Tokhi, 2008).

Recent developments in deep learning (Cha et al., 2017) have led to improvements in the performance of traditional machine learning-based noise cancelation methods. Because of the availability of a sufficient amount of data and computational power, it is possible to train deep machines to learn highly complex nonstationary patterns and behaviors (Deng & Yu, 2014). Convolutional neural networks (CNNs) overcome the limitation of single-filter usage in a multilayer perceptron (MLP) network, which limits the ability of an MLP to generalize. Long short-term memory (LSTM) is a special kind of recurrent neural network (RNN) that includes a memory unit. This type of LSTM network addresses the problem of the vanishing gradient or gradient blow-up present in the ERNN. Researchers have shown that LSTM works well by remembering long data for prediction problems (Fu & Zhang, 2016; Duan & Yisheng, 2016). Park et al., (2019) applied LSTM for ANC, along with CNN, RNN, and MLP. The results of their study showed that the LSTM results closely mimic those of an MLP, as LSTM is highly dependent on long-term temporal dependencies. Zhang and Wang (2021) also used CNN for the feedback ANC problem. The authors compared the proposed CRN-n with traditional methods, such as VFxLMS (Guo et al., 2018) and FxMLP, and it outperformed those two traditional methods. These CNN-based methods adopt generic types of traditional deep CNNs.

SUMMARY OF THE INVENTION

It is an aspect of the invention to provide a new advanced deep learning-based ANC algorithm for an ANC controller to address nonstationary high nonlinearities of noises and their environments, such as primary and secondary paths, in various noisy environments, including construction sites.

According to an aspect of the invention there is provided a computer-implemented method for generating anti-noise using an anti-noise generator to suppress noise from a noise source in an environment, the computer-implemented method comprising:

receiving a sound signal representative of ambient sound in the environment including the noise from the noise source and the anti-noise from the anti-noise generator, wherein the ambient sound also includes propagation noise from the environment;

processing the sound signal using a deep learning algorithm configured to generate an anti-noise signal to form anti-noise, wherein the deep learning algorithm comprises:
   a convolution layer;
   after the convolution layer, a series of atrous scaled convolution modules, wherein each of the atrous scaled convolution modules comprises an atrous convolution, a nonlinear activation function after the atrous convolution, and a pointwise convolution after the nonlinear activation function;
   after the series of atrous scaled convolution modules, a recurrent neural network; and
   after the recurrent neural network, a plurality of fully connected layers; and outputting the anti-noise signal to the anti-noise generator.

According to another aspect of the invention there is provided a controller for generating an anti-noise signal to suppress noise from a noise source in an environment, wherein the controller is operatively connectable to an anti-noise generator configured to generate anti-noise based on the anti-noise signal, wherein the controller comprises a processor and a non-transitory memory operatively connected to the processor and storing instructions to execute the steps of:

processing, using a deep learning algorithm configured to generate the anti-noise signal, a sound signal representative of ambient sound in the environment including the noise from the noise source and concurrent anti-noise from the anti-noise generator, wherein the deep learning algorithm comprises:
   a convolution layer;
   after the convolution layer, a series of atrous scaled convolution modules, wherein each of the atrous scaled convolution modules comprises an atrous convolution, a nonlinear activation function after the atrous convolution, and a pointwise convolution after the nonlinear activation function;
   after the series of atrous scaled convolution modules, a recurrent neural network; and
   after the recurrent neural network, a plurality of fully connected layers; and outputting the anti-noise signal.

This provides an arrangement which is better suited for suppressing noise which is sporadic or spasmodic.

Typically, a dimension of the convolution layer is smaller than a dimension of the sound signal.

In the illustrated arrangement, the dimension of the convolution layer is 10 times smaller than the dimension of the sound signal.

In the illustrated arrangement, the convolution layer comprises a single filter.

In the illustrated arrangement, the deep learning algorithm further includes an initial nonlinear activation function intermediate the convolution layer and the series of atrous scaled convolution modules.

In the illustrated arrangement, the initial nonlinear activation function is a hyperbolic tangent activation function.

In the illustrated arrangement, an input of the series of atrous scaled convolution modules is forwarded to an input of the recurrent neural network.

In the illustrated arrangement, the nonlinear activation function of each of the atrous scaled convolution modules is a scaled exponential linear unit function.

In the illustrated arrangement, the atrous convolutions of the series of atrous scaled convolution modules have different dilation rates.

In the illustrated arrangement, the dilation rates of the atrous convolutions exponentially increase from an initial one of the series of atrous scaled convolution modules to a final one thereof.

Preferably, powers of the exponents increase consecutively from one atrous convolution to the next.

In the illustrated arrangement, the dilation rates have a common base, wherein the common base is two.

In the illustrated arrangement, filter quantities of the atrous convolutions increase from an initial one of the series of atrous scaled convolution modules to a final one thereof.

In the illustrated arrangement, the filter quantities of the atrous convolutions are consecutive multiples of 10.

In the illustrated arrangement, the series of atrous scaled convolution modules comprises four atrous scaled convolution modules.

In the illustrated arrangement, an output of each of the series of atrous scaled convolution modules, except for an initial one thereof, comprises an output of the atrous convolution and an output of the pointwise convolution.

In the illustrated arrangement, the output of the initial one of the series of atrous scaled convolution modules comprises an input thereto and the output of the pointwise convolution thereof.

In the illustrated arrangement, an output of the pointwise convolution of each of the series of atrous scaled convolution modules, except for a final one thereof, is forwarded to an input of the recurrent neural network.

In the illustrated arrangement, an output of the atrous convolution of the final one of the series of atrous scaled convolution modules is forwarded to the input of the recurrent neural network.

In the illustrated arrangement, the deep learning algorithm further includes a dropout layer intermediate the series of atrous scaled convolution modules and the recurrent neural network.

In the illustrated arrangement, an input to the dropout later is an output of a final one of the series of atrous scaled convolution modules.

In other words, forwarded outputs of the pointwise convolutions of earlier atrous scaled convolution modules bypass the dropout layer.

In the illustrated arrangement, the recurrent neural network comprises a plurality of recurrent units.

In the illustrated arrangement, the plurality of recurrent units comprises two recurrent units.

In the illustrated arrangement, a first one of the fully connected layers includes a nonlinear activation function and a second one of the fully connected layers, downstream from the first one, has a linear activation function.

In the illustrated arrangement, the nonlinear activation function is a rectified linear unit function.

In the illustrated arrangement, the plurality of fully connected layers comprises two fully connected layers.

BRIEF DESCRIPTION OF THE DRAWINGS

The invention will now be described in conjunction with the accompanying drawings in which:

FIGS. 5A through 5I are graphs of noise training datasets of environments including construction/cutting, Leopard, Volvo, Flight1, Flight2, Aero1, Aero2, Aero3 and Aero4;

FIG. 10 is a graph showing training loss curve;

FIGS. 11Ai through 11Aiii are graphs showing input noise, proposed anti-noise (model outputs) and residual noise for a construction/cutting environment;

FIGS. 11Bi through 11Biii are graphs showing input noise, proposed anti-noise (model outputs) and residual noise for a Leopard environment;

FIGS. 11Ci through 11Ciii are graphs showing input noise, proposed anti-noise (model outputs) and residual noise for a Volvo environment;

FIGS. 11Di through 11Diii are graphs showing input noise, proposed anti-noise (model outputs) and residual noise for a Fight1 environment;

FIGS. 11Ei through 11Eiii are graphs showing input noise, proposed anti-noise (model outputs) and residual noise for a Fight2 environment;

FIGS. 11Fi through 11Fiii are graphs showing input noise, proposed anti-noise (model outputs) and residual noise for an Aero1 environment;

FIGS. 11Gi through 11Giii are graphs showing input noise, proposed anti-noise (model outputs) and residual noise for an Aero2 environment;

FIGS. 11Hi through 11Hiii are graphs showing input noise, proposed anti-noise (model outputs) and residual noise for an Aero3 environment; and FIGS. 11Ii through 11Iiii are graphs showing input noise, proposed anti-noise (model outputs) and residual noise for an Aero4 environment.

In the drawings like characters of reference indicate corresponding parts in the different figures.

DETAILED DESCRIPTION

Figure 1:
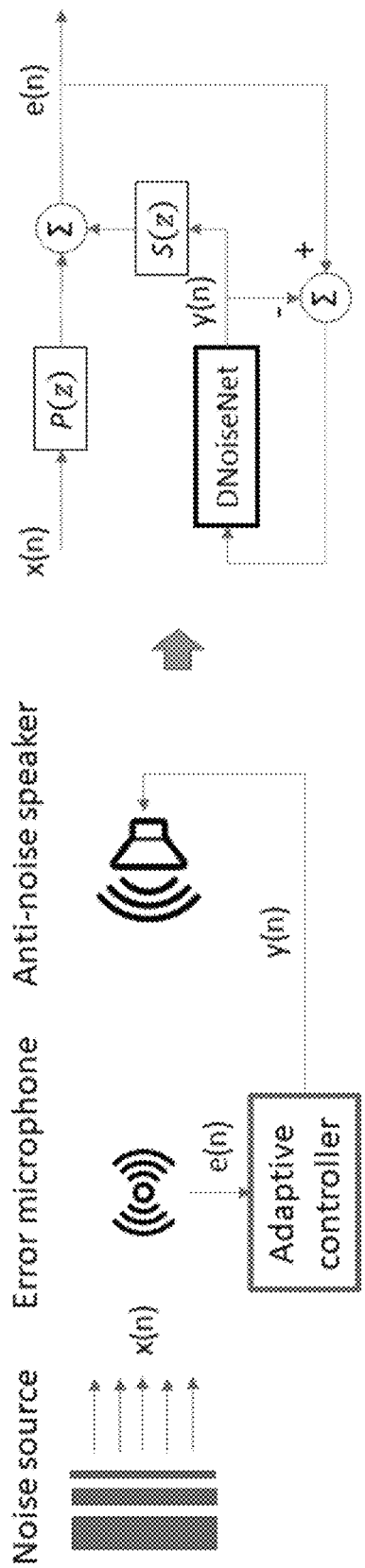
FIG. 1 is a block diagram of an active noise cancellation (ANC) system according to an arrangement of the present invention.

With reference to the accompanying drawings, a deep learning-based ANC system to cancel unwanted noises in various environments is disclosed. The system is a single-sensor-based active and adaptive noise control system which is operative without a clear understanding of the environmental effects of the primary and second paths of noises and generated anti-noises. An adaptive controller which stores and executes a deep learning-based anti-noise generator of the system, referred to as DNoiseNet for convenient reference, considers the temporal features of unwanted noises. In FIG. 1, x(n) is the source of the noises, and y(n) is the anti-noise generated by the DNoiseNet. P(z) and S(z) are the environments of the primary and secondary paths, respectively. e(n) is the remaining error noise after the superposition of the converted noise signal from x(n) due to P(z) and the converted anti-noise signal from y(n) due to S(z).

DNoiseNet is the ANC algorithm configured to generate effective anti-noises. The role of DNoiseNet is to produce anti-noises to cancel unwanted noise in various environmental conditions. The proposed deep learning network is carefully designed by integrating causal convolution (Conv) layers, atrous scaled convolution (ASC) modules [composed of 1 D atrous convolution (AConv), a scaled exponential linear unit (SeLU), and pointwise convolution (PW)], an RNN, and fully connected layers (FCLs) to generate anti-noise signals.

Figure 2:
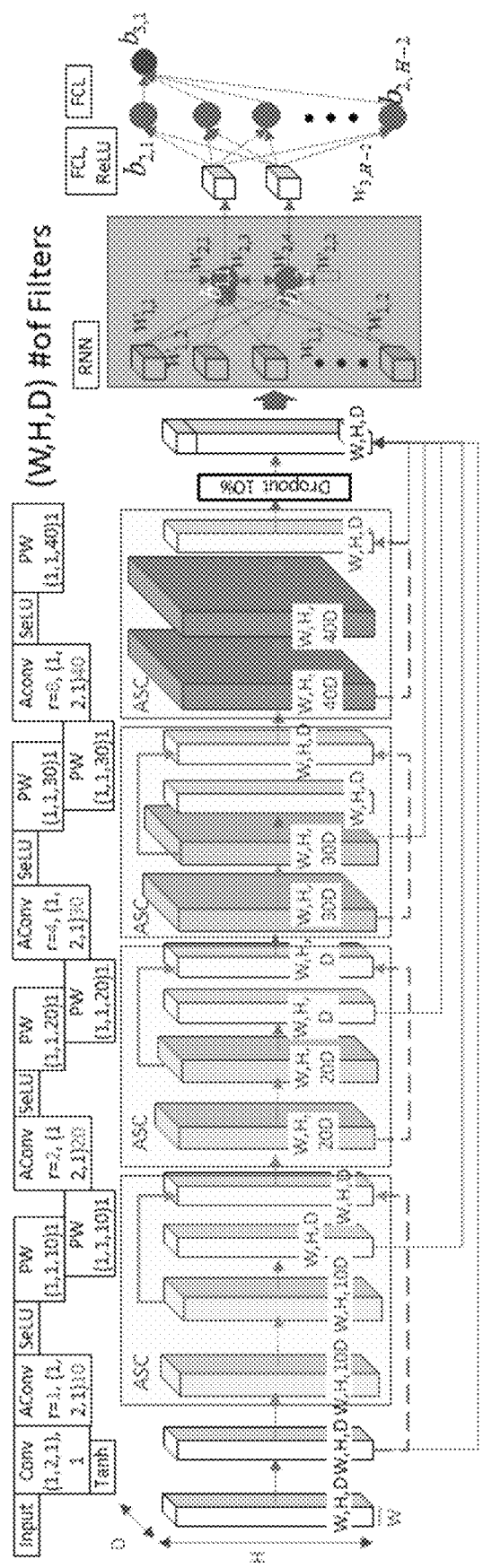
FIG. 2 shows an architecture of deep learning algorithm according to an arrangement of the present invention.

The measured input (W×H×D=1×20×1) from the microphone, as shown in FIG. 1, is first processed by the Conv layer with a filter size of 1×2×1, which is the main building block of traditional CNNs. The mathematical meaning of the convolution is the dot product using the filter, which has learnable parameters through the training process of the proposed network. The parenthesis in each convolutional operation block, such as Conv, AConv, and PW, in FIG. 2 presents each filter's W, H, D, and the number of its filters. The main advantage of the Conv layer is the extraction of local temporal variations. The local temporal variation is captured by convolving smaller receptive filters over the input channels and then passing the output to the next neuron or activation filter. The number of pixels that a filter moves is expressed as a stride value. The size of the output feature map can be mathematically given in Equation (1).

$$O = \frac{H - K}{s} + 1, \qquad (1)$$

where O is the output size of the Conv, H is an input size that is the same as the H in FIG. 2, K (1) is the receptive filter size of the Conv, and S(1) is the stride size. Zero padding is used to maintain the data size from the Conv layers. The weights of the filters are initialized from a Gaussian distribution with a standard deviation between specified values and a mean of zero. To make the results reproducible, a random number generator was fed with the constant seed of 2019. To reduce the overfitting and better generalization, $l2_{regularization}$ in Equation (2) was applied on the kernels (Cortes & Mohri, 2012).

$$l2_{regularization} = \lambda \Sigma_{i=1}^{n} w_i^2 \qquad (2)$$

where $\lambda$ is a regularization parameter, and $w_i$ is $i^{th}$ weight. The result of the Conv layer after Tanh activation function is fed into the ASC module and forwarded to the end of the dropout layer to keep low-level features using skip connections. Skip connections prevent the problem of accuracy saturation and degradation (He & Zhang, 2016).

Figure 3:
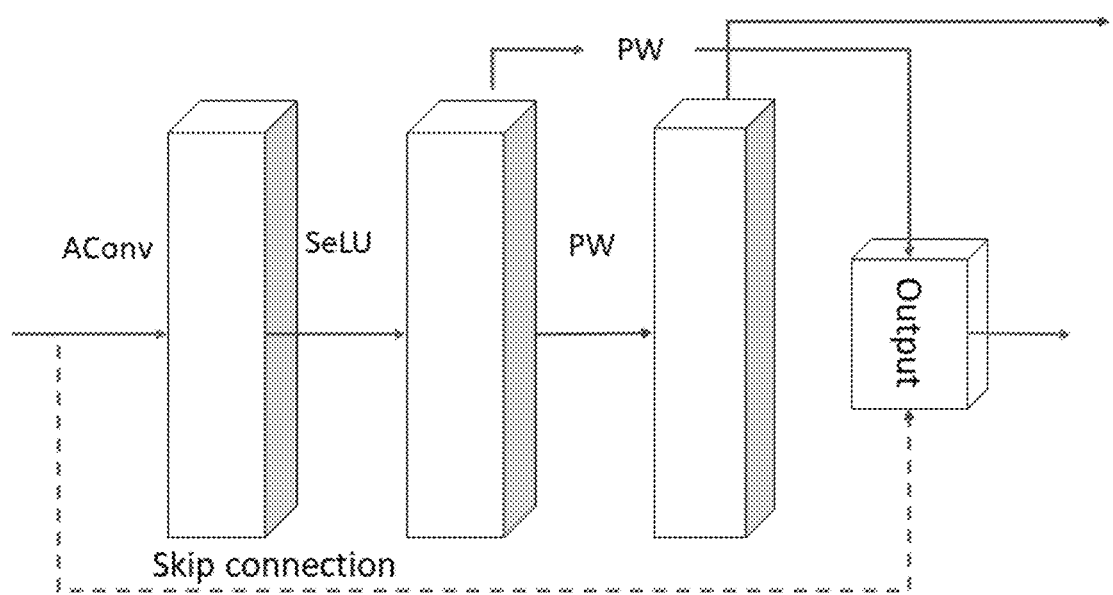
FIG. 3 shows an atrous scalable convolution module of the deep learning algorithm of the arrangement of FIG. 2.

To cancel existing noises, an inverse noise pulse should be generated. DNoiseNet can predict inverse noise signals. Noise prediction is dependent on previous noise data points. To predict the likelihood of the data point x(t) at time t, the ASC module is designed by integrating a 1 D AConv, SeLU, and PW, as shown in FIGS. 2 and 3. AConv expands its receptive field without increasing the computational costs to extract multiple levels of invariant features from the input data.

We implemented 1 D AConvs with different atrous dilation rates (r) in four consecutive ASC modules, as shown in FIG. 2. The different dilation rates (r) of the convolution filter reduce the computational cost and increase the output speed by considering the temporal information of the measured noise. In the proposed ASC module, the dilation rate for each ID AConv layer is given in Equation (3). Each dilated convolution is then followed by nonlinearity.

$$r \in \{2^0, 2^1, 2^2, \ldots, 2^{L-1}\} \qquad (3)$$

where r is the dilation rate, and L is the number of stacked ASC modules. This exponential growth of the dilation rate gives the exponential growth of the receptive field without increasing the number of computations. The output feature maps from the 1 D AConv can be mathematically described in Equation (4) (Borovykh & Bohte, 2017).

$$z^l(i,h) = \Sigma_{j=-\infty}^{j=\infty} \Sigma_{m=1}^{M_{l-1}} w_h^l(j,m) f^{l-1}(i-r \cdot j, m) \qquad (4)$$

where i is the location of convolution, l is subsequent layer, j is size of convolution, m is the number of filters, $z^l(i, h)$ represents feature maps from dilation, r is the dilation rate, $f^{l-1}$ is the input feature map from the previous convolution, $w_h^l(j,m)$ is the filter weights, and $M_l$ is the number of channels.

Figure 4:
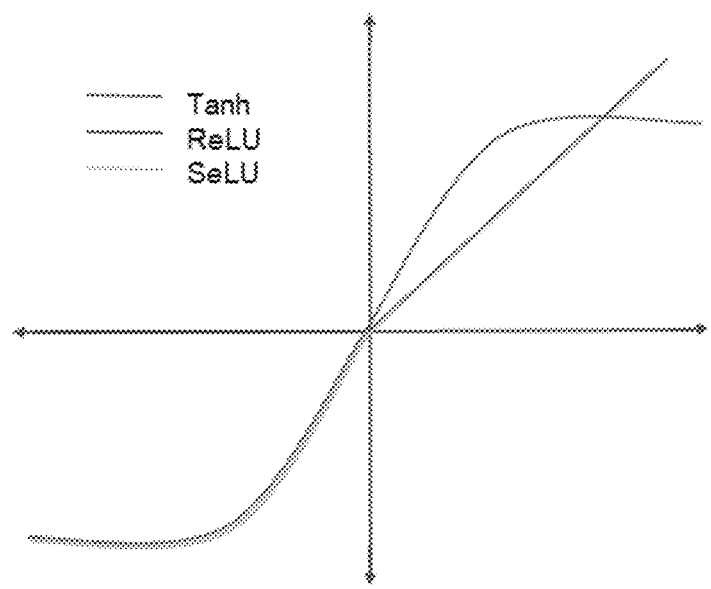
FIG. 4 shows performance of various activation functions implemented in the deep learning algorithm of the arrangement of FIG. 2.
Figure 6A:
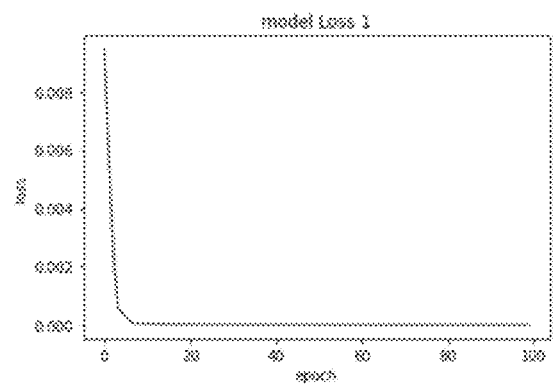
FIGS. 6A through 6D are graphs of different model training losses with different learning rates.
Figure 6B:
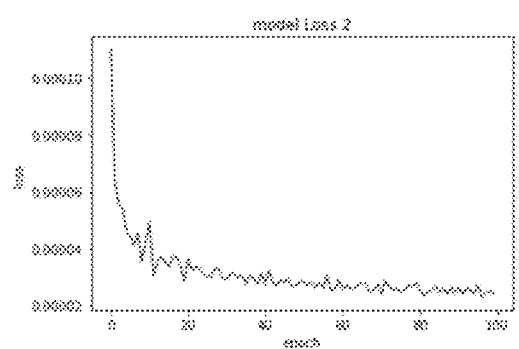
Figure 6C:
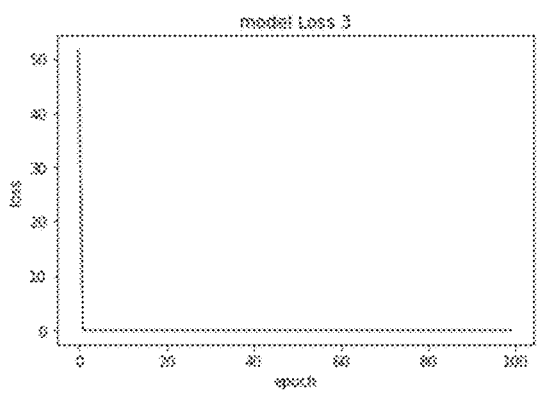
Figure 6D:
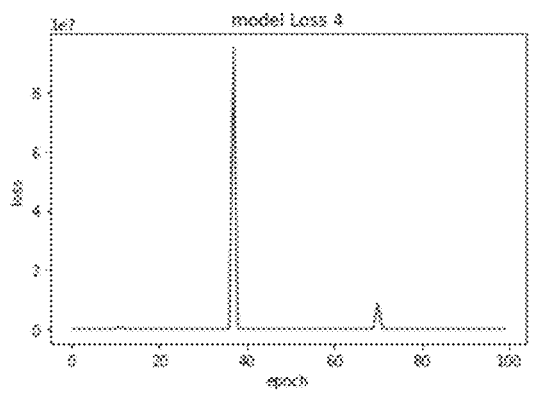

In the proposed architecture of the DNoiseNet, three nonlinear functions are implemented (Tanh, ReLU, and SeLU), as shown in FIG. 2. Tanh applied in the Conv layer is a nonlinear function, as shown in FIG. 4. SeLU applied in the ASC module can be mathematically defined in Equation (5).

$$\text{output} = \lambda \{\alpha e^{input} - \alpha; \text{input} \leq 0 \text{input}; \text{input} > 0. \qquad (5)$$

This function mimics ReLU when the input is greater than zero. However, when the input is less than equal to zero, the output is defined by two parameters 'α' and 'λ'. The values of λ and α are given as α=1.6733, and λ=1.0507 (Klambauer & Unterthiner, 2017). SeLU has recently been adopted to deep neural networks because this function converges the weights toward zero mean and invariant variance; it can therefore be trained on many deep layers by considering nonlinearity.

The ReLU applied in FCLs is comparatively easy to train using gradient-based optimizations, mathematically defined in Equation (6).

$$\text{output} = \{0; \text{input} \leq 0 \text{input}; \text{input} > 0. \qquad (6)$$

Unlike other nonlinear functions, such as sigmoid, Tanh, and SeLU, ReLU has fewer problems with gradient saturation. Another main advantage of the ReLU is its sparsity (Nair & Hinton, 2010). The output will be zero when the input is less than or equal to zero, as shown in FIG. 4, which makes some neurons inactive. These types of dead neurons make the model more concise and less overfitted to specific data.

The extracted features through 1 D AConv and SeLU are forwarded and added to the end of the 10% Dropout layer to keep the specific-level features and are also processed by PW to combine multi-level features extracted from the previous Convs and 1 D AConvs to be a robust anti-noise generator, as shown in FIGS. 2 and 3.

The extracted multi-level features from the traditional Conv and ASC modules are fed into RNN, as shown in FIG. 2. The role of the RNN is to consider the global temporal features of the input noise signal set. Equation (7) shows the mathematical form of the recurrence relation related to each time step.

$$F_t = F(F_{t-1}, x_n) \qquad (7)$$

where $F_t$=hidden state of the unit, $F_{n-1}$=hidden state of the previous unit, $x_n$=input at time step t, and F=function set by weighted connections. Equation (8) represents the calculation of the hidden state, and Equation (9) determines the outputs from a recurrent unit.

$$F_t = \tanh(x_n \cdot U + W \cdot F_{t-1}) \qquad (8)$$

$$h_t = \text{softmax}(V \cdot F_t) \qquad (9)$$

where $x_n$ is input at time 't', U is the weights of input to hidden cell, W is the weighted hidden state, $F_{t-1}$ is the previous hidden state, and V is the weight of hidden cell to output. Two recurrent units are used, followed by two FCLs with 18 units plus ReLU activation and 1 unit plus linear activation. The total number of trainable parameters is 444. The network eventually generates an anti-noise signal at each time step.

A mean square error (MSE) was used as a loss function in the suggested model to train the proposed DNoiseNet. It is the mean squared absolute difference of the target and predicted values. Equation (10) shows the formula for MSE.

$$MSE = \frac{1}{N} \sum_{k=0}^{N} |\text{predicted}_k - \text{true}_k|^2 \qquad (10)$$

where N is the number of data points. MSE is considered more suitable than mean absolute error for a dataset that is closer to zero (Hyndman & Koehler, 2006). To optimize the tunable parameters of the network, an ADAM optimizer (Kingma & Ba, 2014) is used. ADAM is a combination of the RMS prop (Tieleman & Hinton, 2012) and stochastic gradient descent with momentum (SGDM) (Qian et al., 1999). The optimization of the network is based on calculating momentum by moving average and correcting learning rates using gradient squares. The loss function as $E_{w,b}$ and gradient descent of mini batch for weights 'w' and bias 'b' is given in Equations (11-13), respectively.

$$E_{w,b} = \frac{1}{N} \sum_{K=0}^{N} |\text{predicted} - \text{true}|^2 \qquad (11)$$

$$E_{w,b} = \frac{1}{N} \sum_{k=0}^{N} |\text{error}_k|^2$$

For the individual dataset, $$\frac{\partial E}{\partial w} = 2 \cdot \text{error} \cdot \frac{\partial}{\partial w} |\text{error}| \qquad (12)$$

$$\frac{\partial E}{\partial b} = 2 \cdot \text{error} \cdot \frac{\partial}{\partial b} |\text{error}|. \qquad (13)$$

The ADAM optimizer uses these mini batch gradients to calculate the moving average and squared gradients. The mathematical representation of the moving average gradient and squared gradient for mini batch 'j' is given in Equations (14-15). $\beta_1$ and $\beta_2$ are hyper-parameters having values of 0.9 and 0.999 (Kingma & Ba, 2014).

$$m_j = \beta_1 m_{j-1} + (1 - \beta_1)\frac{\partial E_j}{\partial w_j} \quad (14)$$

$$v_j = \beta_2 v_{j-1} + (1 - \beta_2)\frac{\partial E_j^2}{\partial w_j} \quad (15)$$

Variables $m_j$, $v_j$ were initialized as zero; then after t iterations, m and v given in Equation (16) can be calculated by using the property that the expected value of moving average $E(m_j)$ and the squared gradient $E(v_j)$ are directly related to true first $$E\left(\frac{\partial E_j}{\partial w_j}\right)$$

and second moment $$E\left(\frac{\partial E_j^2}{\partial w_j}\right).$$

$$m_j = (1 - \beta_1)\sum_{i=0}^{j}\beta_1^{j-i}\frac{\partial E_i}{\partial w_i} \quad (16)$$

$$v_j = (1 - \beta_2)\sum_{i=0}^{j}\beta_1^{j-i}\frac{\partial E_i^2}{\partial w_i}$$

where $E(m_j) = E\left(\frac{\partial E_j}{\partial w_j}\right) = E\left(\frac{\partial E_j}{\partial w_j}\right)(1 - \beta_1^j) + \zeta,$ and $E(v_j) = E\left(\frac{\partial E_j^2}{\partial w_j}\right) = E\left(\frac{\partial E_j^2}{\partial w_j}\right)(1 - \beta_2)\sum_{i=0}^{j}\beta_1^{j-i} + \zeta, \zeta = 0$ if the first and second moments are stationary. Bias corrections on estimators $m'_j$ and $v'_j$ are performed using Equation (17).

$$m'_j = \frac{m_j}{1 - \beta_1^j} \quad (17)$$

$$v'_j = \frac{v_j}{1 - \beta_2^j}$$

To train and test the proposed deep learning-based DNoiseNet, various noise data were established. Using these datasets, various parametric studies of the proposed training method were conducted.

To evaluate the performance of the proposed model, four different types of noisy environments were considered: construction sites, a vehicle interior, a military vehicle interior, and two airplane cockpits. Noise data from the first three environments was collected from the online data repository signal processing information base (SPIB, 2020). The following list details the noise datasets from these environments:

Construction/cutting and welding noises: The noise sample included noise coming from plate-cutting machinery and welding equipment. The samples were collected using a ½" B&K condenser microphone.
Military vehicle noise (Leopard): The noise samples were recorded using a ½" B&K condenser and stored on a digital audio tape (DAT). The microphone was mounted on a Leopard-1 traveling at 70 km/h.
Vehicle interior noise (Volvo 340): This dataset was gathered while the vehicle was being driven at 140 km/h on an asphalt road in the rain. The noise data were recorded with a ½" B&K condenser microphone and stored on a DAT.
Airplane cockpit noise data from various flights. A NTiXL2 sound level meter with a type-1 NTi microphone was used to analyze the sounds. The sounds were recorded on many flights using an M-Audio data recorder, and the data extracted from these flights were divided into several small datasets: Flight, Flight1, Aero1, Aero2, Aero3, and Aero4.

Table 1 presents the nine training and nine testing noise datasets generated from the original four noise datasets, and FIG. 5 shows the time history for each dataset. For the training datasets, the following were selected: Construction (2,000), Volvo (2,000), Leopard (2,000), Flight1 (10,000), Flight2 (10,000), Aero1 (5,000), Aero2 (5,000), Aero3 (5,000), and Aero4 (5,000) samples. The datasets were normalized within the range of zero and one during the training. Construction, Leopard, and Volvo were sampled at a rate of 19.98 kHz with 16-bit precision, whereas Flight1, Flight1, Aero1, Aero2, Aero3, and Aero4 were sampled at a sampling rate of 44.1 kHz. The input size for the proposed method was selected as 20 samples based on previous studies in the same field (Park et al., 2019) for fair comparative studies. The series of Flights and Aeros are different airplane flight paths.

To configure the optimum hyperparameters for the DNoiseNet, a number of possible models were designed and tested. The effects of the learning rate, dropout, optimizers, and learning rate decay on the model losses were examined and the hyperparameters for the final network were selected based on the studies described below.

A learning rate highly affects the convergence of algorithms based on back propagation (Wilson & Martinez, 2001). To study the effect of learning rate on the model, Flight1 and Volvo training data were used to consider various noise scenarios, and four learning rates, 0.001, 0.01, 0.05, and 0.1, were selected. Because of the complex nature of noise, a small learning rate of 0.001 was initially selected and the effects of the other parameters were studied using this learning rate. FIG. 6 shows the model losses for the different learning rates. Model loss 1, model loss 2, model loss 3, and model loss 4 correspond to learning rates of 0.001, 0.01, 0.1, and 0.05, respectively, and their training losses are 0.000018, 0.000023, 0.008000, and 0.113000, respectively, as presented in Table 2. The highest training loss was observed, with a learning rate of 0.05; the other learning rates provided remarkably fewer losses, as shown in FIG. 6.

Figure 7:
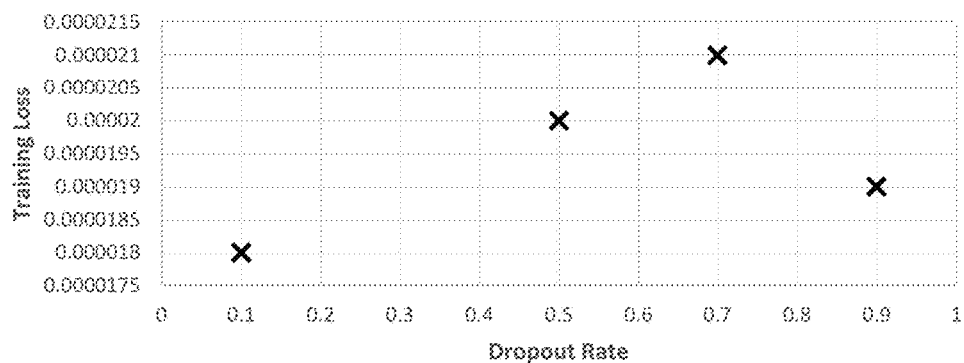
FIG. 7 is a graph showing effect of dropout on training loss.

We introduced dropouts to the model to avoid overfitting (Srivastava & Hinton, 2014). Four different dropout rates were selected: 0.1, 0.5, 0.9, and 0.7, and their training losses were 0.000018, 0.000020, 0.000019, and 0.000021, respectively, as shown in Table 2. This meant that there were 1 in 10, 1 in 2, 1 in 1.11, and 1 in 1.42 respective chances that a node would be excluded from each weight update cycle. FIG. 7 shows the effects of different dropout rates on training losses. As seen in FIG. 7, a dropout rate of 0.1 corresponded to less training loss compared to dropout rates of 0.5, 0.7, and 0.9.

Figure 8:
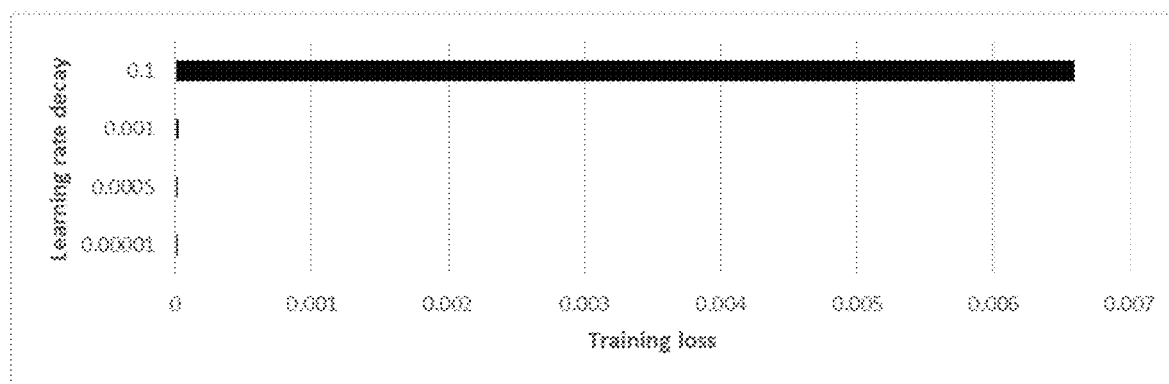
FIG. 8 is a graph showing effect of learning rate decay.

To determine the effect of learning rate on the model, four learning rates were selected: 0.00001, 0.0005, 0.001, and 0.1. You and Long (2019) suggested that learning rate decay can help a network learn more complex data. FIG. 8 shows the plot of training loss versus learning rate decay. Table 2 shows that the lower the decay rate, the lower the training loss. The best result was yielded by a learning rate decay of 0.00001, corresponding to a training loss of 0.000018.

Figure 9:
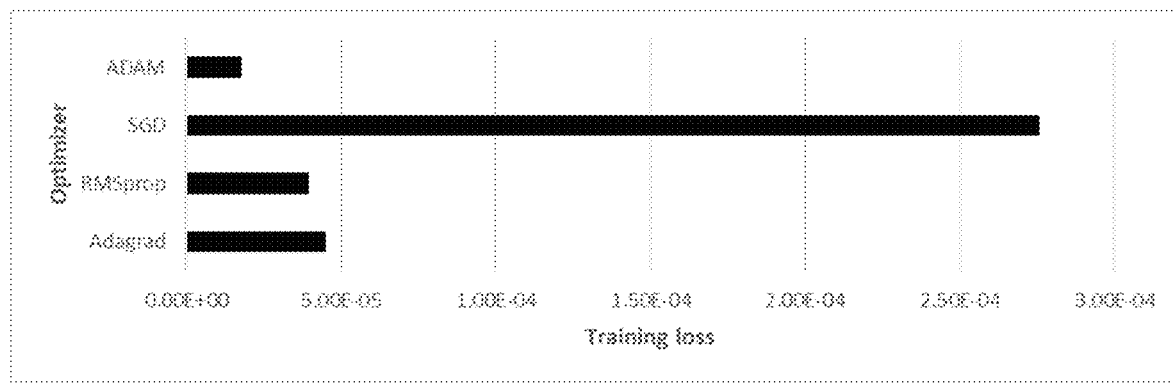
FIG. 9 is a graph showing performance of the optimizer on training.

To select the best optimizer for the network, four network optimization methods were studied. FIG. 9 shows the results of Adagrad (Duchi & Hazan, 2011), RMSprop (Tieleman & Hinton, 2012), SGD (Qian et al., 1999), and ADAM optimizers in terms of training loss. ADAM outperformed the other three optimizers, as presented in Table 2; it was the fastest and involved much less fine tuning.

Based on previous parametric studies, final hyperparameters were determined as 0.001 as learning rate, 0.1 as drop out, 0.000010 as learning rate decay, and ADAM as optimizer. As the training dataset, Flight1 (10,000 samples) was selected as an example training set. The training dataset was divided into 9,781 training samples and 219 validation samples. A batch size of 100 was selected to speed up the process. The training was performed on a GPU (TESLA K80, NVIDIA) with 12 GB of available RAM. The time taken for each epoch was approximately 3 seconds. The training and validation losses both flattened after 95 epochs. However, a slightly declining loss was still observed at 100 epochs. The training MSE presented in Equation (10) at epoch 100 was 7.4460e-05, with an accuracy of 0.0019, as shown in FIG. 10. Moreover, the MSE for the validation dataset in the same epoch was 5.4184e-05. The other datasets were similarly used for training and prediction.

Testing samples (Construction/Cutting, Leopard, Volvo, Flight1, Flight2, Aero1, Aero2, Aero3, and Aero4) were selected to test the model, as presented in Table 2. This testing was also performed on a GPU (K80) with 12 GB of available RAM. These samples were never used by the model during training. FIG. 11 shows the outputs of the proposed method with the corresponding inputs and residual noises. The proposed DNoiseNet showed very strong performances in predicting anti-noises to cancel the various unwanted input noises.

To compare the performance of the proposed DNoiseNet, four recently developed state-of-the-art algorithms were selected for use as benchmarks: normalized least mean square (NLMS), MLP, LSTM, and deep CNN. The training and testing were performed on a GPU (TESLA K80, NVIDIA) with 12 GB of available RAM.

To measure the performance of the NLMS algorithm (Dixit & Nagaria, 2017), a convergence controlling factor of 9.094947017729282e-13 was selected, and the number of taps selected for the finite impulse response filter was 20. Weight updating was achieved using Equation (18):

$$w(n+1)=w(n)+\mu(n) \cdot x_f(n) \cdot e(n), \tag{18}$$

where $\mu(n)$ is the learning rate; $w(n)$ is the filter weight; $x_f(n)$ is the input sample and $e(n)$ is the error, which differs between the prediction and target value. An MLP-based ANC was used to predict the nine noise datasets. The MLP architecture proposed by Park et al. (2019) is composed of 20 input units, followed by 20 hidden units, and one output layer. The incoming training noise was normalized within the range of zero and one. An LSTM-based ANC with 20 inputs, 20 hidden states, and one output (Park et al., 2019) was selected. A similar batch size of 100 and 200 epochs was selected for the dataset. A CNN-based ANC (Park et al., 2019) with one convolution layer, four filters, and a kernel size of 1×5 was used. The tanh activation function was used for the convolution layer, and zero padding was used to keep the output size the same as the input size. A max pooling layer was applied after 1 D convolution, and the selected pooling size for this layer was two. The output from the max pooling layer was flattened and passed to a dense layer consisting of 40 neurons, and this layer output one prediction as an anti-noise sample. A batch size of 100 was selected for training the network with the ADAM optimizer.

To compare the performances of the four different ANCs, three evaluation metrics were used: noise attenuation, root mean square error (RMSE), and the number of trainable parameters. Noise attenuation is a representation of the amount of noise cancelation (i.e., the higher the noise attenuation value, the higher the amount of noise cancelation). The noise attenuation was calculated using Equation (19):

$$\text{Noise attenuation (dB)} = 10 \cdot \log_{10} \cdot \frac{E_N}{E_R} \tag{19}$$

where $E_N$ is the energy of noise signal, and $E_R$ is the energy of the residual noise signal. Table 3 shows the calculations for the proposed methods: LSTM, MLP, and NLMS. The proposed DNoiseNet resulted in the best performance in terms of the average (i.e., 38.86).

Neill & Hashemi (2018) suggested the usefulness of the RMSE to compare the accuracies of different models. The performance of the proposed method was compared to the other methods based on RMSE metrics calculated using Equation (20). The RMSE is the square root of the mean of the square of the difference between the target value ($t_i$) and the observed value ($o_i$), as follows.

$$RMSE = \sqrt{\frac{1}{n} \sum_{i=1}^{n} (t_i - o_i)^2} \tag{20}$$

where n is number of samples. Tables 5(a)-(b) present the RMSEs for the different methods when applied to the different noise datasets. The proposed DNoiseNet resulted in the best performance in terms of RMSE, as tabulated as 0.0132.

Table 5 presents the number of trainable parameters for each ANC model. The greater the number of parameters, the greater the time delay, and the increased consumption of the system's inbuilt memory. ANC systems have minimum delay, and it is desirable to have a small number of trainable parameters to reduce the processing time. Table 5 shows that the proposed architecture had just 444 parameters, while the LSTM and MLP algorithms had almost seven to two times more trainable parameters. However, the CNN algorithm had only 65 trainable parameters.

We proposed an advanced deep learning-based active noise controller named DNoiseNet to cancel various high nonlinear and nonstationary noises, such as noises in construction sites and noises inside vehicles and airplane cockpits. DNoiseNet was carefully designed by careful integration of advanced Conv, AConv, PW, ReLU, ASP module, RNN, and FCL to capture the multi-level temporal features of the noises to effectively cancel various noises and reduce computational costs.

To investigate the performance of DNoiseNet, nine noise datasets were used to train and test the proposed model. The input size for the proposed method was selected as 20 samples by considering previous studies in the same field (Park et al., 2019). Zero padding was used to regulate the input and output of the convolution layers. The following list shows the technical findings and contributions of this study:
1) First ANC (DNoiseNet) based on deep learning was developed for construction site noises using the concept of a single sensor-based feedback active noise control.
2) DNoiseNet showed the best performances compared to four other ANCs (traditional NLMS, deep learning based MLP, LSTM, and deep CNN) in terms of RMSE and noise attenuation metrics to cancel various high nonlinear and nonstationary noises.
3) Extensive parametric studies were conducted to find optimal hyper parameters, such as effective learning rate, dropout rate, learning weight decay rate, and network optimizer.
4) The proposed model outperformed other state of the art ANCs based deep learning with fewer trainable parameters for controlling computational costs.

As described hereinbefore, external environmental noises in construction sites affect human mental health and work performance. To avoid these detrimental effects, interest in active noise control/cancelation (ANC) has increased because of the availability of efficient circuits and computational power in ANCs without structural limitations. However, most ANC systems are based on traditional linear filters with limited efficiency due to the high nonlinear and nonstationary nature of various noises. This disclosure proposes an advanced deep learning-based active noise controller named DNoiseNet to overcome the limitations of the traditional active noise controllers. Mathematical operators (i.e., atrous convolution, pointwise convolution, nonlinear activation filters, and recurrent neural networks) learn multi-level temporal features under different noises in various environments, such as construction sites, vehicle insides, and airplane cockpits. Through extensive parametric and comparative studies, the DNoiseNet showed the best performance in terms of root mean square error and noise attenuation metrics.

As described therein and hereinbefore, the present invention relates to a computer-implemented method for generating anti-noise using an anti-noise generator to suppress noise from a noise source in an environment, which comprises the general steps of:
receiving a sound signal representative of ambient sound in the environment including the noise from the noise source, the anti-noise from the anti-noise generator and propagation noise from the environment;
processing the sound signal using a deep learning algorithm configured to generate an anti-noise signal to form anti-noise, wherein the deep learning algorithm comprises:
a convolution layer, which may alternatively be referred to as a causal convolution layer;
after the convolution layer, a series of atrous scaled convolution modules, wherein each of the atrous scaled convolution modules comprises an atrous convolution, a nonlinear activation function after the atrous convolution, and a pointwise convolution after the nonlinear activation function;
after the series of atrous scaled convolution modules, a recurrent neural network; and
after the recurrent neural network, a plurality of fully connected layers; and
outputting the anti-noise signal to the anti-noise generator.

The sound signal is captured or measured using a sound sensor or detector. The sound sensor, typically in the form of a microphone, is preferably disposed spatially intermediate the noise generator and the anti-noise generator. A location of the sound sensor is registered or coincident with a location of a user in the environment for whom the noise is to be suppressed.

Since the sound sensor is physically separated and spaced or distanced from at least one of the noise generator and anti-noise generator, the propagation noise from the environment is imparted on a corresponding one of the sounds generated and transmitted from the spaced sound generator. As such, the sound received (by the sensor) is different from the sound transmitted (from the corresponding generator). Furthermore, since the noise generator and anti-noise generator are distinct, and thus physically separate and spaced from one another, environmental propagation noise in a corresponding one of the received sounds is different.

The received sound signal is an actual or current sound signal which is a superposition of the noise and the anti-noise that have been generated at substantially the same instant in time. The anti-noise signal generated using the deep learning algorithm is a next future instant in time. In other words, the anti-noise signal that is generated is based on a received or captured sound signal comprising earlier noise and anti-noise.

Furthermore, as described therein and hereinbefore, the present invention also relates to a method of generating anti-noise comprising the general steps:
capturing ambient sound in an environment including noise from a noise generator in the environment, concurrent anti-noise from an anti-noise generator in the environment and propagation noise of the environment;
processing a signal representative of the ambient sound using a deep learning algorithm configured to generate an anti-noise signal to form anti-noise, wherein the deep learning algorithm comprises:
a convolution layer, which may alternatively be referred to as a causal convolution layer;
after the convolution layer, a series of atrous scaled convolution modules, wherein each of the atrous scaled convolution modules comprises an atrous convolution, a nonlinear activation function after the atrous convolution, and a pointwise convolution after the nonlinear activation function;
after the series of atrous scaled convolution modules, a recurrent neural network; and
after the recurrent neural network, a plurality of fully connected layers; and
outputting the anti-noise signal to the anti-noise generator to generate the anti-noise.

The ambient sound is captured using a single sound sensor configured to capture sound.

The atrous convolution and the pointwise convolution of the atrous scaled convolution module are considered operators.

The scope of the claims should not be limited by the preferred embodiments set forth in the examples but should be given the broadest interpretation consistent with the specification as a whole.

REFERENCES

Bai, M. & Lee, D., 1997. Implementation of an active headset by using the H∞ robust control theory. *The Journal of the Acoustical Society of America*, 102(4), pp. 2184-2190.

Borovykh, A., Bohte, S. and Oosterlee, C. W., 2017. Conditional time series forecasting with convolutional neural networks. *arXiv preprint arXiv:*1703.04691.

Bjarnason, E. (1995). Analysis of the filtered-X LMS algorithm. *IEEE transactions on speech and audio processing,* 3(6), 504-514.

Cartes, D. A., Ray, L. R. & Collier, R. D., 2002. Experimental evaluation of leaky least-mean-square algorithms for active noise reduction in communication headsets. *The Journal of the Acoustical Society of America,* 111(4), pp. 1758-1771.

Cha, Y. J., Choi, W. and Büyüköztürk, O., 2017. Deep learning-based crack damage detection using convolutional neural networks. Computer-Aided Civil and Infrastructure Engineering, 32(5), pp. 361-378.

Chang, C. Y. & Li, S. T., 2010. Active noise control in headsets by using a low-cost microcontroller. IEEE Transactions on industrial electronics, 58(5), pp. 1936-1942.

Chen, C. K. & Chiueh, T. D., 1996, May. Multilayer perceptron neural networks for active noise cancellation. In 1996 *IEEE International Symposium on Circuits and Systems. Circuits and Systems Connecting the World. ISCAS 96* (Vol. 3, pp. 523-526). IEEE.

Cortes, C., Mohri, M. & Rostamizadeh, A., 2012. L2 regularization for learning kernels. *arXiv preprint arXiv:* 1205.2653.

Denenberg, J. N., 1992. Anti-noise. *IEEE potentials,* 11(2), pp. 36-40.

Deng, L. and Yu, D., 2014. Deep learning: methods and applications. *Foundations and trends in signal processing,* 7(3-4), pp. 197-387.

Dixit, S. & Nagaria, D., 2017. LMS Adaptive Filters for Noise Cancellation: A Review. *International Journal of Electrical & Computer Engineering* (2088-8708), 7(5).

Douglas, S. C., 1999. Fast implementations of the filtered-X LMS and LMS algorithms for multichannel active noise control. *IEEE Transactions on speech and audio processing,* 7(4), pp. 454-465.

Duan, Y., Yisheng, L. V. & Wang, F. Y., 2016, November. Travel time prediction with LSTM neural network. In 2016 *IEEE 19$^{th}$ international conference on intelligent transportation systems (ITSC)* (pp. 1053-1058). IEEE.

Duchi, J., Hazan, E. & Singer, Y., 2011. Adaptive subgradient methods for online learning and stochastic optimization. *Journal of machine learning research,* 12(7).

Elman, J. L., 1990. Finding structure in time. *Cognitive science,* 14(2), pp. 179-211.

L J, Eriksson, 1991. II. Recursive Algorithms for Active Noise Control. IEEJ Transactions on Industry Applications, 111(10), pp. 819-822.

Fu, R., Zhang, Z. & Li, L., 2016, November. Using LSTM and GRU neural network methods for traffic flow prediction. In 2016 31$^{st}$ *Youth Academic Annual Conference of Chinese Association of Automation (YAC)* (pp. 324-328). IEEE.

Gupta, S. & Ghatak, C., 2011. Environmental noise assessment and its effect on human health in an urban area. *International Journal of Environmental Sciences,* 1(7), pp. 1954-1964.

Guo, X., Li, Y., Jiang, J., Dong, C., Du, S., & Tan, L. (2018). Sparse modeling of nonlinear secondary path for nonlinear active noise control. *IEEE Transactions on Instrumentation and Measurement,* 67(3), 482-496.

Hyndman, R. J. & Koehler, A. B., 2006. Another look at measures of forecast accuracy. *International journal of forecasting,* 22(4), pp. 679-688.

Kingma, D. P. & Ba, J., 2014. Adam: A method for stochastic optimization. *arXiv preprint arXiv:*1412.6980.

Klambauer, G., Unterthiner, T., Mayr, A. & Hochreiter, S., 2017. Self-normalizing neural networks. In *Advances in neural information processing systems* (pp. 971-980).

Kuo, S. M. & Morgan, D. R., 1996. *Active noise control systems* (pp. 17-199). New York: Wiley.

Kuo, S. M. and Morgan, D. R., 1999. Active noise control: a tutorial review. *Proceedings of the IEEE,* 87(6), pp. 943-973.

Kaiser, O. E., Pietrzko, S. J. & Morari, M., 2003. Feedback control of sound transmission through a double glazed window. Journal of Sound and Vibration, 263(4), pp. 775-795.

Larsson, M., 2011. *Active control of noise in ventilation systems: Analysis and experiments* (Doctoral dissertation, Blekinge Institute of Technology).

Lee, J. & Swenson, G. W., 1992. Compact sound absorbers for low frequencies. Noise Control Engineering Journal, 38(3), pp. 109-117.

Lueg, P., 1936. Process of silencing sound oscillations. U.S. Pat. No. 2,043,416.

Luo, L., Sun, J. & Huang, B., 2017. A novel feedback active noise control for broadband chaotic noise and random noise. Applied Acoustics, 116, pp. 229-237.

Marburg, S., 2002. Developments in structural-acoustic optimization for passive noise control. *Archives of computational methods in engineering,* 9(4), pp. 291-370.

Na, K. & Chae, S. I., 1997, June. Single-sensor active noise cancellation using recurrent neural network predictors. In *Proceedings of International Conference on Neural Networks (ICNN'97)* (Vol. 4, pp. 21 53-2156). IEEE.

Nair, V. & Hinton, G. E., 2010, January. Rectified linear units improve restricted 29oltzmann machines. In *ICML.*

Neill, S. P. & Hashemi, M. R., 2018. Chapter 8-ocean Modelling for resource characterization. *Fundamentals of Ocean Renewable Energy,* pp. 193-235.

Oppenheim, A. V., Weinstein, E., Zangi, K. C., Feder, M. & Gauger, D., 1994. Single-sensor active noise cancellation. IEEE Transactions on Speech and Audio Processing, 2(2), pp. 285-290.

Park, S., Patterson, E. & Baum, C., 2019, September. Long Short-Term Memory and Convolutional Neural Networks for Active Noise Control. In 2019 5$^{th}$ *International Conference on Frontiers of Signal Processing (ICFSP)* (pp. 121-125). IEEE.

Qian, N., 1999. On the momentum term in gradient descent learning algorithms. *Neural networks,* 12(1), pp. 145-151.

Signal Processing information base (SPIB). http://spib.linse.ufsc.br/noise.html. (Accessed on Feb. 12, 2019).

Srivastava, N., Hinton, G., Krizhevsky, A., Sutskever, I. & Salakhutdinov, R., 2014. Dropout: a simple way to prevent neural networks from overfitting. *The journal of machine learning research,* 15(1), pp. 1929-1958.

Stansfeld, S. A. & Matheson, M. P., 2003. Noise pollution: non-auditory effects on health. *British medical bulletin,* 68(1), pp. 243-257.

Tieleman, T. & Hinton, G., 2012. Lecture 6.5-rmsprop: Divide the gradient by a running average of its recent magnitude. *COURSERA: Neural networks for machine learning,* 4(2), pp. 26-31.

Tobias, O. J. & Seara, R., 2002, September. Performance comparison of the FXLMS, nonlinear FXLMS and leaky FXLMS algorithms in nonlinear active control applications. In 2002 11$^{th}$ *European Signal Processing Conference* (pp. 1-4). IEEE.

Toha, S. F. & Tokhi, M. O., 2008, September. MLP and Elman recurrent neural network modelling for the TRMS.

In 2008 7th *IEEE International Conference on Cybernetic Intelligent Systems* (pp. 1-6). IEEE.

Wilson, D. R. & Martinez, T. R., 2001, July. The need for small learning rates on large problems. In *IJCNN'01. International Joint Conference on Neural Networks. Proceedings* (Cat. No. 01CH37222) (Vol. 1, pp. 115-119). IEEE.

You, K., Long, M., Wang, J. & Jordan, M. I., 2019. How Does Learning Rate Decay Help Modern Neural Networks?.

Zhang, H. & Wang, D., 2021. Deep ANC: A deep learning approach to active noise control. *Neural Networks*, 141, pp. 1-10.

TABLES

TABLE 1

Established datasets.

| Data | Training samples | Testing samples | Input samples | Sampling frequency |
|---|---|---|---|---|
| Construction | 2,000 | 1,937 | 20 | 19.98 kHz |
| Leopard | 2,000 | 1,937 | 20 | 19.98 kHz |
| Volvo | 2,000 | 1,937 | 20 | 19.98 kHz |
| Flight1 | 10,000 | 4,937 | 20 | 44.10 kHz |
| Flight2 | 10,000 | 4,937 | 20 | 44.10 kHz |
| Aero1 | 5,000 | 4,957 | 20 | 44.10 kHz |
| Aero2 | 5,000 | 4,957 | 20 | 44.10 kHz |
| Aero3 | 5,000 | 4,957 | 20 | 44.10 kHz |
| Aero4 | 5,000 | 4,957 | 20 | 44.10 kHz |

TABLE 2

Parameters and Training Loss

| Learning Rate | Training Loss | Dropout Rate | Training Loss | Learning Rate Decay | Training Loss | Optimizer | Training Loss |
|---|---|---|---|---|---|---|---|
| 0.001 | 0.000018 | 0.10 | 0.000018 | 0.000010 | 0.000018 | Adagrad | 0.000049 |
| 0.010 | 0.000023 | 0.50 | 0.000020 | 0.000500 | 0.000019 | RMSprop | 0.000039 |
| 0.100 | 0.008000 | 0.90 | 0.000019 | 0.001000 | 0.000030 | SGD | 0.000276 |
| 0.050 | 0.113000 | 0.70 | 0.000021 | 0.100000 | 0.006600 | ADAM | 0.000018 |

TABLE 3

Noise attenuation levels (dB)

| Data/Method | DNoiseNet | LSTM | MLP | NLMS | CNN |
|---|---|---|---|---|---|
| Leopard | 36.35 | 28.86 | 31.15 | 10.83 | 35.99 |
| Volvo | 33.76 | 32.76 | 31.11 | 13.89 | 31.68 |
| Construction | 17.89 | 16.90 | 16.28 | 12.38 | 16.58 |
| Flight1 | 37.83 | 34.81 | 36.63 | 13.69 | 35.31 |
| Flight2 | 32.65 | 32.29 | 31.63 | 10.24 | 32.54 |
| Aero1 | 40.70 | 35.18 | 40.67 | 10.62 | 37.60 |
| Aero2 | 43.76 | 39.98 | 33.73 | 11.03 | 40.86 |
| Aero3 | 42.08 | 38.50 | 40.28 | 12.44 | 39.83 |
| Aero4 | 43.96 | 39.24 | 39.81 | 11.07 | 40.38 |
| Average | 38.86 | 35.20 | 35.62 | 11.72 | 36.77 |

TABLE 4

RMSE for All Methods

| | Constr. | Leopard | Volvo | Flight1 | Flight2 | Aero1 | Aero2 | Aero3 | Aero4 | Avg. |
|---|---|---|---|---|---|---|---|---|---|---|
| DNoiseNet | 0.0652 | 0.0081 | 0.0105 | 0.0084 | 0.0107 | 0.0052 | 0.0035 | 0.0040 | 0.0035 | 0.0132 |
| LSTM | 0.073 | 0.0192 | 0.0118 | 0.0113 | 0.0112 | 0.0098 | 0.0055 | 0.0060 | 0.0059 | 0.0170 |
| MLP | 0.0784 | 0.0148 | 0.0143 | 0.0094 | 0.0123 | 0.0052 | 0.0112 | 0.0049 | 0.0056 | 0.0173 |
| NLMS | 0.1226 | 0.1530 | 0.1035 | 0.1159 | 0.1652 | 0.1653 | 0.1653 | 0.1206 | 0.1522 | 0.1404 |
| CNN | 0.0758 | 0.0084 | 0.0133 | 0.0112 | 0.0108 | 0.0074 | 0.0049 | 0.0052 | 0.0052 | 0.0158 |

TABLE 5

Number of Trainable Parameters

| | DNoiseNet | LSTM | MLP | CNN |
|---|---|---|---|---|
| Number of trainable parameters | 444 | 3301 | 861 | 65 |

The invention claimed is:

1. A computer-implemented method for generating anti-noise using an anti-noise generator to suppress noise from a noise source in an environment, the computer-implemented method comprising:
   receiving a sound signal representative of ambient sound in the environment including the noise from the noise source and the anti-noise from the anti-noise generator, wherein the ambient sound also includes propagation noise from the environment;
   processing the sound signal using a deep learning algorithm configured to generate an anti-noise signal to form anti-noise, wherein the deep learning algorithm comprises:
   a convolution layer;
   after the convolution layer, a series of atrous scaled convolution modules, wherein each of the atrous scaled convolution modules comprises an atrous convolution, a nonlinear activation function after the atrous convolution, and a pointwise convolution after the nonlinear activation function;

after the series of atrous scaled convolution modules, a recurrent neural network; and after the recurrent neural network, a plurality of fully connected layers; and outputting the anti-noise signal to the anti-noise generator.

2. The computer-implemented method of claim 1 wherein the convolution layer comprises a single filter.

3. The computer-implemented method of claim 1 wherein the deep learning algorithm further includes an initial nonlinear activation function intermediate the convolution layer and the series of atrous scaled convolution modules.

4. The computer-implemented method of claim 3 wherein the initial nonlinear activation function is a hyperbolic tangent activation function.

5. The computer-implemented method of claim 1 wherein an input of the series of atrous scaled convolution modules is forwarded to an input of the recurrent neural network.

6. The computer-implemented method of claim 1 wherein the nonlinear activation function of each of the atrous scaled convolution modules is a scaled exponential linear unit function.

7. The computer-implemented method of claim 1 wherein the atrous convolutions of the series of atrous scaled convolution modules have different dilation rates.

8. The computer-implemented method of claim 7 wherein the dilation rates of the atrous convolutions exponentially increase from an initial one of the series of atrous scaled convolution modules to a final one thereof.

9. The computer-implemented method of claim 8 wherein the dilation rates have a common base, wherein the common base is two.

10. The computer-implemented method of claim 7 wherein filter quantities of the atrous convolutions increase from an initial one of the series of atrous scaled convolution modules to a final one thereof.

11. The computer-implemented method of claim 10 wherein the filter quantities of the atrous convolutions are consecutive multiples of 10.

12. The computer-implemented method of claim 1 wherein the series of atrous scaled convolution modules comprises four atrous scaled convolution modules.

13. The computer-implemented method of claim 1 wherein an output of each of the series of atrous scaled convolution modules, except for an initial one thereof, comprises an output of the atrous convolution and an output of the pointwise convolution.

14. The computer-implemented method of claim 13 wherein the output of the initial one of the series of atrous scaled convolution modules comprises an input thereto and the output of the pointwise convolution thereof.

15. The computer-implemented method of claim 1 wherein an output of the pointwise convolution of each of the series of atrous scaled convolution modules, except for a final one thereof, is forwarded to an input of the recurrent neural network.

16. The computer implemented method of claim 15 wherein an output of the atrous convolution of the final one of the series of atrous scaled convolution modules is forwarded to the input of the recurrent neural network.

17. The computer-implemented method of claim 1 wherein the deep learning algorithm further includes a dropout layer intermediate the series of atrous scaled convolution modules and the recurrent neural network.

18. The computer-implemented method of claim 17 wherein an input to the dropout later is an output of a final one of the series of atrous scaled convolution modules.

19. The computer-implemented method of claim 1 wherein the recurrent neural network comprises a plurality of recurrent units.

20. The computer-implemented method of claim 19 wherein the plurality of recurrent units comprises two recurrent units.

21. The computer-implemented method of claim 1 wherein a first one of the fully connected layers includes a nonlinear activation function and a second one of the fully connected layers, downstream from the first one, has a linear activation function.

22. The computer-implemented method of claim 21 wherein the nonlinear activation function is a rectified linear unit function.

23. The computer-implemented method of claim 1 wherein the plurality of fully connected layers comprises two fully connected layers.

24. A controller for generating an anti-noise signal to suppress noise from a noise source in an environment, wherein the controller is operatively connectable to an anti-noise generator configured to generate anti-noise based on the anti-noise signal, wherein the controller comprises a processor and a non-transitory memory operatively connected to the processor and storing instructions to execute the steps of:

processing, using a deep learning algorithm configured to generate the anti-noise signal, a sound signal representative of ambient sound in the environment including the noise from the noise source and concurrent anti-noise from the anti-noise generator, wherein the deep learning algorithm comprises:

a convolution layer;

after the convolution layer, a series of atrous scaled convolution modules, wherein each of the atrous scaled convolution modules comprises an atrous convolution, a nonlinear activation function after the atrous convolution, and a pointwise convolution after the nonlinear activation function;

after the series of atrous scaled convolution modules, a recurrent neural network; and after the recurrent neural network, a plurality of fully connected layers; and outputting the anti-noise signal.

* * * * *